United States Patent
Mori et al.

(10) Patent No.: US 11,281,376 B2
(45) Date of Patent: Mar. 22, 2022

(54) OPERATION CIRCUIT AND METHOD OF OPERATION FOR USE IN OPERATIONS THAT ARE PERFORMED IN PARALLEL USING MULTIPLE OPERATORS

(71) Applicant: Mitsubishi Electric Corporation, Tokyo (JP)

(72) Inventors: Masashi Mori, Tokyo (JP); Susumu Tanaka, Tokyo (JP); Kazushige Hashimoto, Amagasaki (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 36 days.

(21) Appl. No.: 16/645,599

(22) PCT Filed: Sep. 20, 2018

(86) PCT No.: PCT/JP2018/034834
§ 371 (c)(1),
(2) Date: Mar. 9, 2020

(87) PCT Pub. No.: WO2019/077933
PCT Pub. Date: Apr. 25, 2019

(65) Prior Publication Data
US 2020/0278798 A1   Sep. 3, 2020

(30) Foreign Application Priority Data
Oct. 18, 2017   (WO) .................. PCT/JP2017/037712

(51) Int. Cl.
*G06F 3/06* (2006.01)
*G06F 13/20* (2006.01)

(52) U.S. Cl.
CPC .......... *G06F 3/0613* (2013.01); *G06F 3/0631* (2013.01); *G06F 3/0673* (2013.01); *G06F 13/20* (2013.01)

(58) Field of Classification Search
CPC ............................. G06F 3/0613; G06F 3/0631
See application file for complete search history.

(56) References Cited

U.S. PATENT DOCUMENTS

| 2010/0214936 A1 | 8/2010 | Ito et al. |
| 2013/0262725 A1 | 10/2013 | Ito et al. |
| (Continued) | | |

FOREIGN PATENT DOCUMENTS

| JP | S63311569 A | 12/1988 |
| JP | 2003067360 A | 3/2003 |
| (Continued) | | |

OTHER PUBLICATIONS

Chetlur et al., "Figure 1: Convolution lowering" on p. 4 of the technical literature "cuDNN:Efficient Primitives for Deep Learning" published by NVIDIA Corporation, Oct. 2014, 10 pages.
(Continued)

*Primary Examiner* — David E Martinez
(74) *Attorney, Agent, or Firm* — Buchanan Ingersoll & Rooney PC

(57) ABSTRACT

An operation circuit contains a parallel operation circuit including operators storage circuits. Each storage circuit has an input storage circuit that stores elements of an input vector in an order based on an index of each element; and a coefficient storage circuit including a ring buffer that stores elements of a row or column vector of a coefficient matrix in an order based on an index of each element. Each operator sequentially multiplies the elements of the coefficient matrix in the storage circuit by a corresponding one of the elements of the input vector, and adds a result of multiplication to a corresponding one of elements of the output vector based on the index thereof.

21 Claims, 25 Drawing Sheets

(56) References Cited

U.S. PATENT DOCUMENTS

2017/0371840 A1* 12/2017 Lubberhuizen ......... H04L 65/60
2018/0046458 A1    2/2018 Kuramoto
2020/0142949 A1*  5/2020 Liao ....................... G06F 17/16

FOREIGN PATENT DOCUMENTS

| | | |
|---|---|---|
| JP | 2005149517 A | 6/2005 |
| JP | 2009080693 A | 4/2009 |
| JP | 2009251724 A | 10/2009 |
| JP | 2013206095 A | 10/2013 |
| JP | 2017027314 A | 2/2017 |
| JP | 2018026027 A | 2/2018 |

OTHER PUBLICATIONS

International Search Report (PCT/ISA/210) dated Dec. 14, 2018, by the Japan Patent Office as the International Searching Authority for International Application No. PCT/JP2018/034834.

International Search Report (PCT/ISA/210) dated Dec. 12, 2017, by the Japan Patent Office as the International Searching Authority for related International Application No. PCT/JP2017/037712.

International Search Report (PCT/ISA/210) dated Dec. 4, 2018, by the Japan Patent Office as the International Searching Authority for International Application No. PCT/JP2018/034834.

* cited by examiner

FIG.3

OPERATION CIRCUIT AND METHOD OF OPERATION FOR USE IN OPERATIONS THAT ARE PERFORMED IN PARALLEL USING MULTIPLE OPERATORS

TECHNICAL FIELD

The present disclosure relates to an operation circuit and a method of operation, and in particular, relates to an operation circuit and a method of operation which are suitable for use in, for example, operations that are performed in parallel using multiple operators.

BACKGROUND ART

A method of operation called a convolutional neural network (CNN) is often used in many fields, such as image processing, voiceprint analysis, robotics, etc., which require pattern recognitions. In general, CNN includes a convolution layer which performs convolution operation, a pooling layer which calculates local statistics, and a fully connected layer. The convolution layer repeats a multiply-and-add operation involving a kernel (also referred to as a filter) an input feature map corresponding to the kernel, while scanning the kernel pixelwise over the input feature map, and performs non-linear transformation on the final result of the multiply-and-add operation, thereby generating an output feature map.

The primary operation in these layers is an add operation (Ax+b), adding a product of a large matrix (A) having many zero value elements and a vector (x) and an offset (b). Conventionally, the operation is processed by a parallel processing unit using multiple operators, thereby reducing an amount of time required for the operation.

For example, Japanese Patent Laying-Open No. 2009-251724 (PTL 1) discloses a vector processor having multiple operation pipelines as a technology for accelerating the operation of a large matrix (A) having many zero value elements and a vector (x). If the number of data items to be operated by one vector operation instruction is not an integer multiple of the number of pipelines, the vector processor causes a pipeline, not executing an instruction, to execute the next vector operation instruction. This accelerates the parallel processing.

Japanese Patent Laying-Open No. 2003-67360 (PTL 2) also discloses a multiply-and-add operation unit which reads N data items in a given address order and performs a multiply-and-add operation. When N data items include a value 0, the multiply-and-add operation unit generates addresses in a memory device for storing data, except for an address corresponding to the data having a value 0. This prevents a multiply-and-add operation from being performed on the data having a value 0, thereby reducing an amount of operations, achieving an accelerated operation.

CITATION LIST

Patent Literature

PTL 1: Japanese Patent Laying-Open No. 2009-251724
PTL 2: Japanese Patent Laying-Open No. 2003-67360

SUMMARY OF INVENTION

Technical Problem

The product operation process of a matrix (A) and a vector (x) in a parallel operation unit having multiple operators, basically, broadly consists of (i) a process of each operator loading, from an external unit, elements of a matrix (A) an offset (b), and an vector (x) to be operated; (ii) a process of multiple operators performing operations in parallel using the loaded data; and (iii) a process of each operator outputting a result of the operation to an external unit.

According to such a configuration, as the parallelism of the parallel operation increases, the operation process time decreases, causing an access request from each operator to the external unit more likely to occur simultaneously. When multiple access requests from respective operators occur simultaneously, the multiple access requests needs to be adjusted, such as being ordered and rearranged. Consequently, the process times of the data input process (i) from an external unit and the data output process (iii) do not decrease. For this reason, although the parallel operation process is accelerated, the entire process time is limited by the data input process (i) and the data output process (iii), failing to reduce the entire process time as expected.

PTL 1 discloses the technology for accelerating the parallel operation process, but fails to disclose a technology for reducing the processing time for the data input process (i) or the data output process (iii) described above.

PTL 2 also discloses the technology for accelerating the operation by not producing an address corresponding to data having a value 0, but fails to disclose a technology for reducing the processing time for the data input process (i) or the data output process (iii) described above in the parallel operation process.

The present disclosure is made in view of the above problem, and an object of the present disclosure is to provide an operation circuit and a method of operation which allow for reduction in the entire process time.

Solution to Problem

An operation circuit according to one embodiment includes: a parallel operation circuit which includes a plurality of operators each configured to multiply a coefficient matrix by an input vector from a right side of the coefficient matrix and outputs results of operation to an output vector, the coefficient matrix including a non-zero element and a zero-element; and an input interface which includes a plurality of storage circuits. The operation circuit supplies each of the plurality of operators with elements of a vector to be operated, in order the elements are operated. The plurality of operators are in one-to-one correspondence with the plurality of storage circuits. The plurality of storage circuits each have: an input storage circuit that stores elements of the input vector; and a coefficient storage circuit that includes a ring buffer and stores elements of a row or column vector included in the coefficient matrix into the ring buffer. The elements of the input vector and the elements of the coefficient matrix each have an index designating an order in which the element is multiplied. The input interface stores the elements of the input vector and the elements of the coefficient matrix into an input storage circuit and the ring buffer included in the coefficient storage circuit, in the order based on the index of each element, the input storage circuit and the ring buffer corresponding to an operator among the plurality of operators. Each of the plurality of operators sequentially multiplies the elements of the row or column vector of the coefficient matrix of the storage circuit and a corresponding one of the elements of the input vector, and adds results of multiplications to a corresponding element of the output vector.

Advantageous Effects of Invention

According to the above embodiment, the elements of the input vector or the elements of a row or column vector of the coefficient matrix are stored into the input storage circuit and the ring buffer included in the coefficient storage circuit, which are corresponding to one operator among the multiple operators, in accordance with an order in which the elements are operated, the order being based on indices of the elements. This allows, prior to performance of an operation by each operator, elements of an input vector and elements of a row or column vector of a coefficient matrix, which are required for operation by the operator, to be prepared in the order in which the elements are operated, via the input storage circuits or the coefficient storage circuits. Accordingly, this obviates the need for rearrangement of the elements, reducing the entire process time for the parallel operation.

Moreover, since the elements of the row or column vector of the coefficient matrix are stored in the ring buffer, the process of initializing the coefficient storage circuit each time the operation begins using elements of the same row or column vector of a coefficient matrix as an input vector, can be eliminated when the operation is repeated while changing the input vector. Moreover, since the need for the initialization process is obviated, the entire process time for the parallel operation can be reduced.

BRIEF DESCRIPTION OF DRAWINGS

FIG. 3 is a diagram for illustrating deployment of a feature map and a kernel.

DESCRIPTION OF EMBODIMENTS

Figure 1:
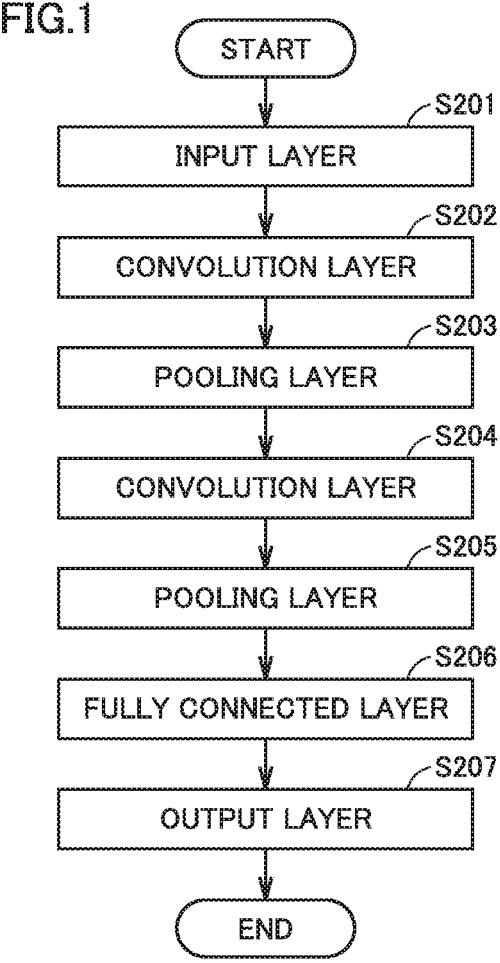
FIG. 1 is a flowchart illustrating an operation process by CNN.

The following describes each embodiment in detail with reference to figures. Noted that the same or corresponding components will be given the same reference characters and will not be described repeatedly. Note that while an operation circuit and a method of operation according to the present disclosure are suitably for use in convolution operation in CNN, but are not limited to CNN and are applicable to other fields.

Embodiment 1

Process of CNN

A CNN will be briefly described first. FIG. 1 is a flowchart illustrating an operation process by the CNN.

Referring to FIG. 1, CNN includes an input layer S201, convolution layers S202, S204, pooling layers S203, S205, a fully connected layer S206, and an output layer S207.

Input layer S201 receives input of data to be processed, such as image data. Output layer S207 outputs a final result of processing of the data. While FIG. 1 shows a combination of the convolution layer and the pooling layer twice (S202, S203; S204, S205) for ease of description, the combination may be repeated more than twice.

Input data of the convolution layer is called an input feature map, and output data of the convolution layer is called an output feature map. Each of convolution layers S202, S204 repeats a multiply-and-add operation involving a kernel (also referred to as a filter) an input feature map corresponding to the kernel, while scanning the kernel pixelwise over the input feature map, and performs non-linear transformation on the final result of the multiply-and-add operation, thereby generating an output feature map. The elements (also referred to as "weights") of the kernel are predetermined by learning. Details of the convolution operation will be described below, with reference to FIG. 2.

Each of pooling layers S203, S205 performs an operation to collect elements of a local domain of the output feature map into one element so as to reduce a spatial size of the feature map. Each of pooling layers S203, S205 takes the maximum value of the local domain, or averages the elements included in the local domain, for example.

One or multiple fully connected layers S206 are provided adjacent to output layer S207. Each neuron of fully connected layer(s) S206 has a connection to all the neurons of an adjacent layer.

Convolution Operation

Figure 2:
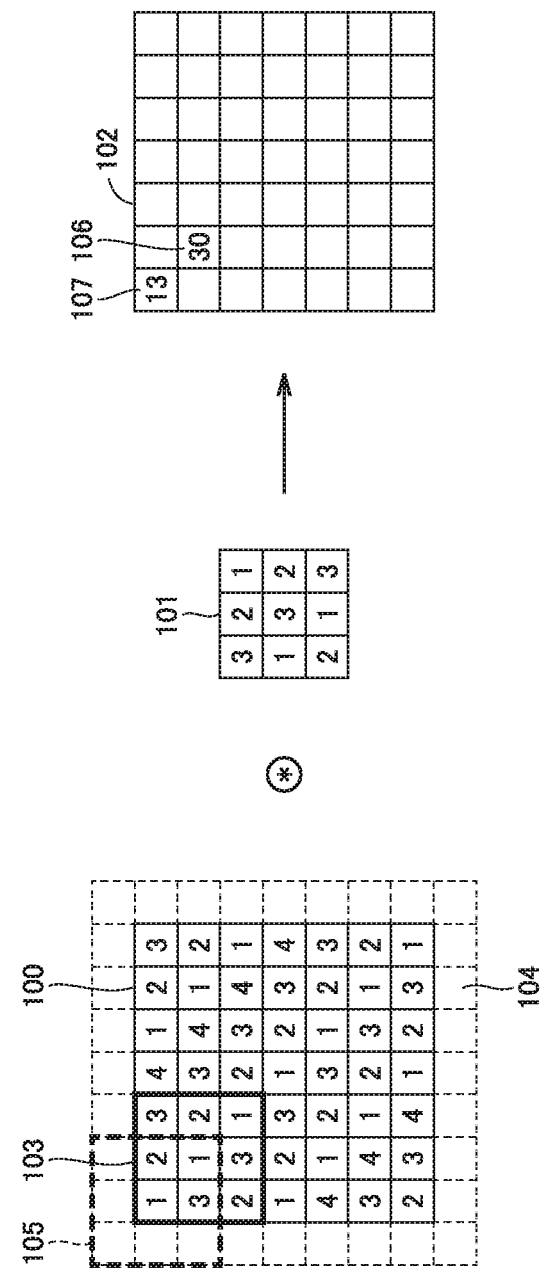
FIG. 2 is a diagram for illustrating a convolution operation.

FIG. 2 is a diagram for illustrating a convolution operation. As shown in FIG. 2, output data 102 is generated by a convolution operation of a kernel 101 and input data 100 as an input feature map. A bias is added to each element of output data 102 and an activation function is further applied to each element, thereby producing an output feature data element. For example, a non-linear function, such as a rectified linear unit (ReLU), is used as an activation function.

For ease of description, in the example of FIG. 2 input data has a size of (7, 7) and the kernel has a size of (3, 3). For adjustment of an output data size, surrounding 104 of input data 100 may be filled with fixed data (e.g., 0). This is referred as padding. Padding having a width of 1 and a value 0 is applied to input data 100 of FIG. 2.

In the convolution operation, each element of kernel 101 and a corresponding element of input data 100 are multiplied and a sum thereof is determined, while sliding kernel 101 over input data 100, including the padding portion, at regular intervals. In other words, a multiply-and-add operations is performed. A result of the multiply-and-add operation is stored as a corresponding element of output data 102. The interval at which kernel 101 is slid is called a stride. In the case of FIG. 2, the stride is 1.

Specifically, when the arrangement of kernel 101 matches a thick solid box 103 of FIG. 2, a result of the multiply-and-add operation, which is "30", is stored as an element 106 at a corresponding location in output data 102. When the arrangement of kernel 101 matches a thick dashed box 105 of FIG. 2, a result of the multiply-and-add operation, which is "13", is stored as an element 107 at a corresponding location in output data 102.

Deployment of Feature Map and Kernel

Figure 3:
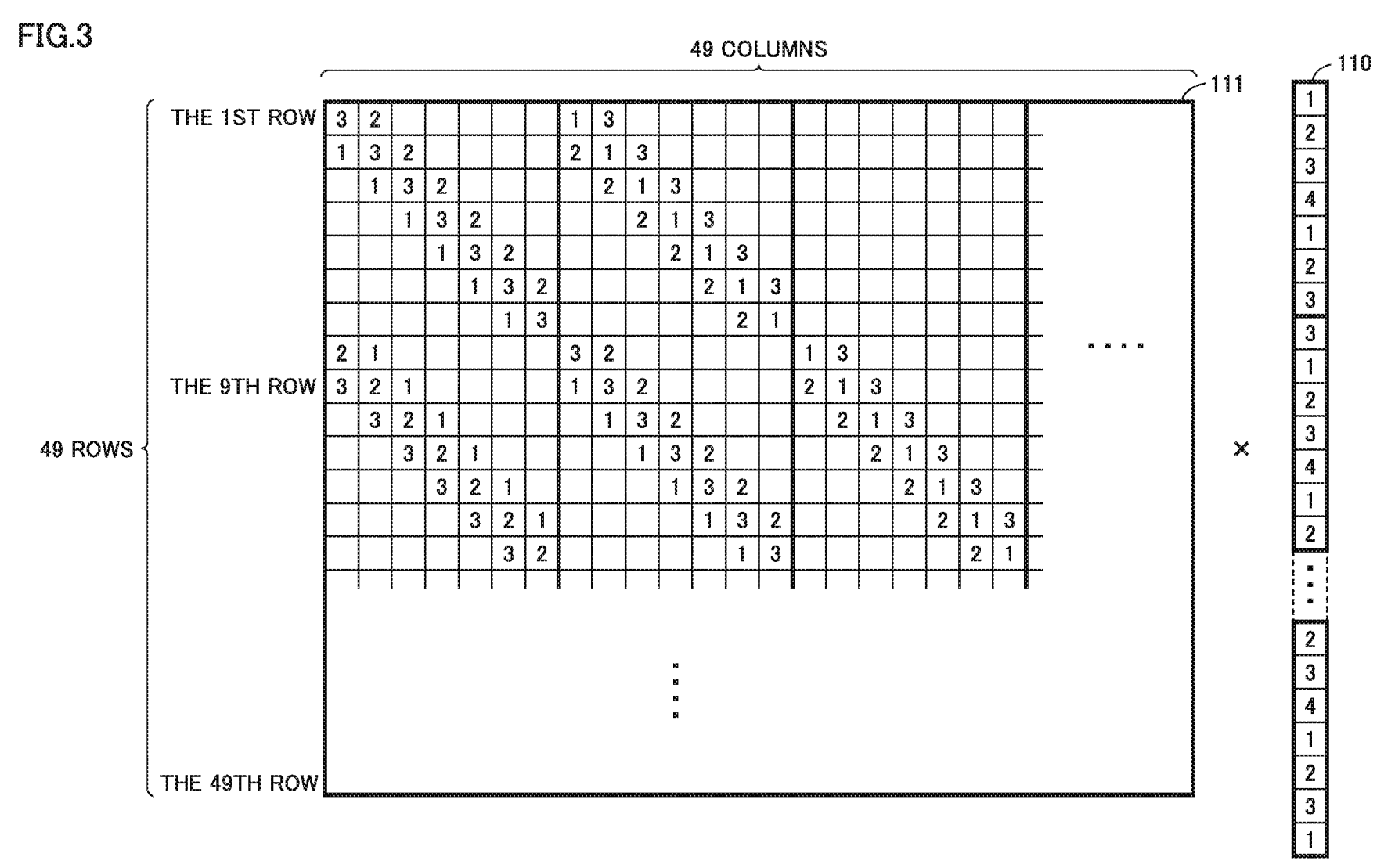

FIG. 3 is a diagram for illustrating deployment of a feature map and the kernel. In Embodiment 1, in order to shorten the process time of the convolution operation, the rows of the feature map are connected together, thereby deploying the a feature map into one column.

Specifically, referring to FIGS. 2 and 3, an input vector 110 of FIG. 3 is generated by connecting the rows of input data 100 of FIG. 2 are connected together. The number of elements of input vector 110 corresponding to input data 100 is 7×7=49. The rows of output data 102 of FIG. 2 are also connected together and deployed into one column. The number of elements of output vector corresponding to output data 102 is also 49.

Kernel 101 of FIG. 2 is deployed in a matrix to generate an output vector corresponding to output data 102 of FIG. 2 $d$ when multiplied by input vector 110 from the right. This generates a coefficient matrix 111. Coefficient matrix 111 has 49 rows from the first row to the 49th row, and 49 columns from the first column to the 49th column. Note that the empty elements in coefficient matrix 111 shown in FIG. 3 has a value 0.

Specifically, the first row of coefficient matrix 111 is (3, 2, 0, 0, 0, 0, 0, 1, 3, 0, . . . , 0), corresponding to kernel 101 of FIG. 2 located over the feature map at the position indicated by a thick dashed box 105. A multiply-and-add operation is performed using the first row of coefficient matrix 111 and input vector 110, generating data "13" to be stored as an element 107 in output data 102 of FIG. 2, the element 107 corresponding to the first row of coefficient matrix 111.

Similarly, the ninth row of coefficient matrix 111 is (3, 2, 1, 0, 0, 0, 0, 1, 3, 2, 0, 0, 0, 0, 2, 1, 3, 0, . . . , 0), corresponding to kernel 101 of FIG. 2 located over the feature map at the position indicated by a thick solid box 103. A multiply-and-add operation is performed using the ninth row of coefficient matrix 111 and input vector 110, generating data "30" to be stored as an element 106 in output data 102 of FIG. 2, the element 106 corresponding to the ninth row of coefficient matrix 111.

When no padding is applied in FIG. 2, input vector 110 corresponding to input data 100 is not changed, and has 49 elements. Since output data 102 has a data size of (5, 5), the number of elements of an output vector corresponding to output data 102 is 5×5=25. Coefficient matrix 111 corresponding to kernel 101 also has 25 rows and 49 columns.

Generally, a matrix operation expression performed in the convolution operation is represented by Equation (1). In other words, an output vector f for the convolution operation is obtained by multiplying a coefficient matrix A by an input vector x from a right side of coefficient matrix A, and adding a bias vector b to the operation result. Here, a characteristic of coefficient matrix A is that coefficient matrix A contains relatively many elements having a value 0.

[MATH 1]

$$f = A \cdot x + b \quad (1)$$

$$\begin{bmatrix} f_1 \\ f_2 \\ \vdots \\ f_n \end{bmatrix} = \begin{pmatrix} A_{11} & A_{12} & \cdots & A_{1m} \\ A_{21} & A_{22} & \cdots & A_{2m} \\ \vdots & \vdots & \ddots & \vdots \\ A_{n1} & A_{n2} & \cdots & A_{nm} \end{pmatrix} \cdot \begin{bmatrix} x_1 \\ x_2 \\ \vdots \\ x_m \end{bmatrix} + \begin{bmatrix} b_1 \\ b_2 \\ \vdots \\ b_n \end{bmatrix}$$

Herein, the elements of output vector f are indicated as $f_1, \ldots, f_n$. The i-th element of output vector f is described as $f_i$ or f(i). The elements of input vector x are indicated as $x_1, \ldots, x_m$. The j-th element of input vector x is described as $x_j$ or x(j). The elements of bias vector b are indicated as $b_1, \ldots, b_n$. The i-th element of bias vector b is described as $b_i$ or b(i). Coefficient matrix A consists of n rows from the first to the n-th row, and m columns from the first to the m-th column. An element of coefficient matrix A at the i-th row and the j-th column will be described as $A_{ij}$ or A (i, j). In Embodiment 1, values ij and j which are each an index of an element is an identifier of the element and also can designate: an operator CLk (described below) used to operate the element; the operator CLk of the element; and an order in which the element is operated.

In convolution operation, there is also a case where a coefficient is represented by a coefficient matrix (Fm), and an input and an output are each also represented in a matrix (Dm, Om), rather than in a vector, as shown in "FIG. 1: Convolution lowering" on page 4 of the technical literature "cuDNN:Efficient Primitives fwor Deep Learning" published by NVIDIA Corporation. This case will be referred to as a "matrix case." The convolution operation in the matrix case calculates a product of a matrix and a matrix.

Schematic Configuration of Operation Circuit

Figure 4:
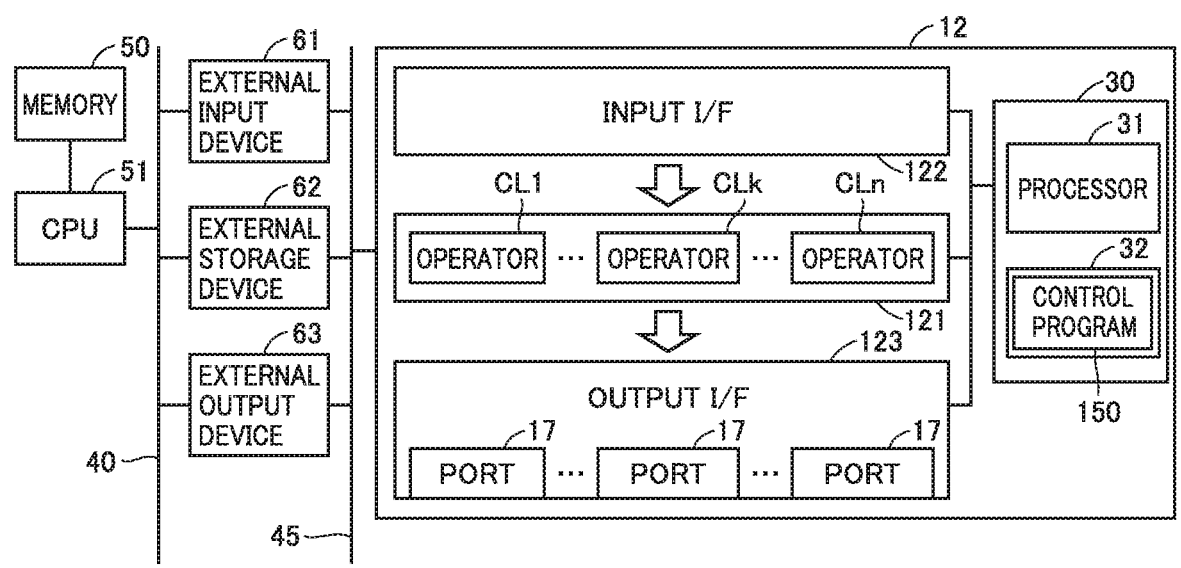
FIG. 4 is a diagram showing one example configuration of an operation circuit 12 according to Embodiment 1 in association with peripheral circuits.

FIG. 4 is a diagram showing one example configuration of an operation circuit 12 according to Embodiment 1 in association with peripheral circuits. Operation circuit 12 is one embodiment of an "operation unit." Referring to FIG. 4, operation circuit 12 includes: a control circuit 30 which is a dedicated circuit for controlling respective components in operation circuit 12; a parallel operation circuit 121 having multiple operators CLk (k=1, 2, 3 . . . n) each of which performs a multiply-and-add operation; an input I/F (an abbreviation of interface) 122; and an output I/F (Interface) 123. Operation circuit 12 has multiple operators CLk. Each operator CLk is provided in one-to-one correspondence with one of rows of coefficient matrix A.

When operation circuit 12 performs a matrix operation shown in Equation (1), each operator CLk performs a multiply-and-add operation in parallel with other operators CLk.

Control circuit 30 includes a processor 31 and a memory 32 including, for example, a nonvolatile storage medium. A control program 150 for controlling operation circuit 12 is stored in memory 32.

Operation circuit 12 is connected, via a bus 45, to: an external input device 61 which inputs, to operation circuit 12, data for operation; an external output device 63 which outputs an operation result obtained from operation circuit 12 to the outside; and an external storage device 62, such as an SRAM (Static Random Access Memory).

External input device 61, external storage device 62, and external output device 63 are connected, via a bus 40, to a central processing unit (CPU) 51 which includes a memory 50. Memory 50 stores coefficient matrix A, input vector x, bias vector b, and a result of operation by operation circuit 12.

CPU 51 controls external input device 61, external storage device 62, and external output device 63. For example, CPU 51 reads coefficient matrix A, input vector x, and bias vector b from memory 50, and outputs them to input I/F 122 of operation circuit 12 via external input device 61 or external storage device 62. External output device 63 inputs an operation result from output I/F 123, and outputs the input operation result to CPU 51 via bus 40. CPU 51 stores the operation result from external output device 63 into memory 50. The operation result from output I/F 123 may also be stored into external storage device 62. External storage device 62 and external output device 63 are connected to output I/F 123 via wired or wireless multiple lines. Output I/F 123 includes ports 17 connecting the lines.

Note that memory 50 may be connected to bus 40, rather than CPU51. External storage device 62 may include memory 50.

Configuration of Operators

Figure 5:
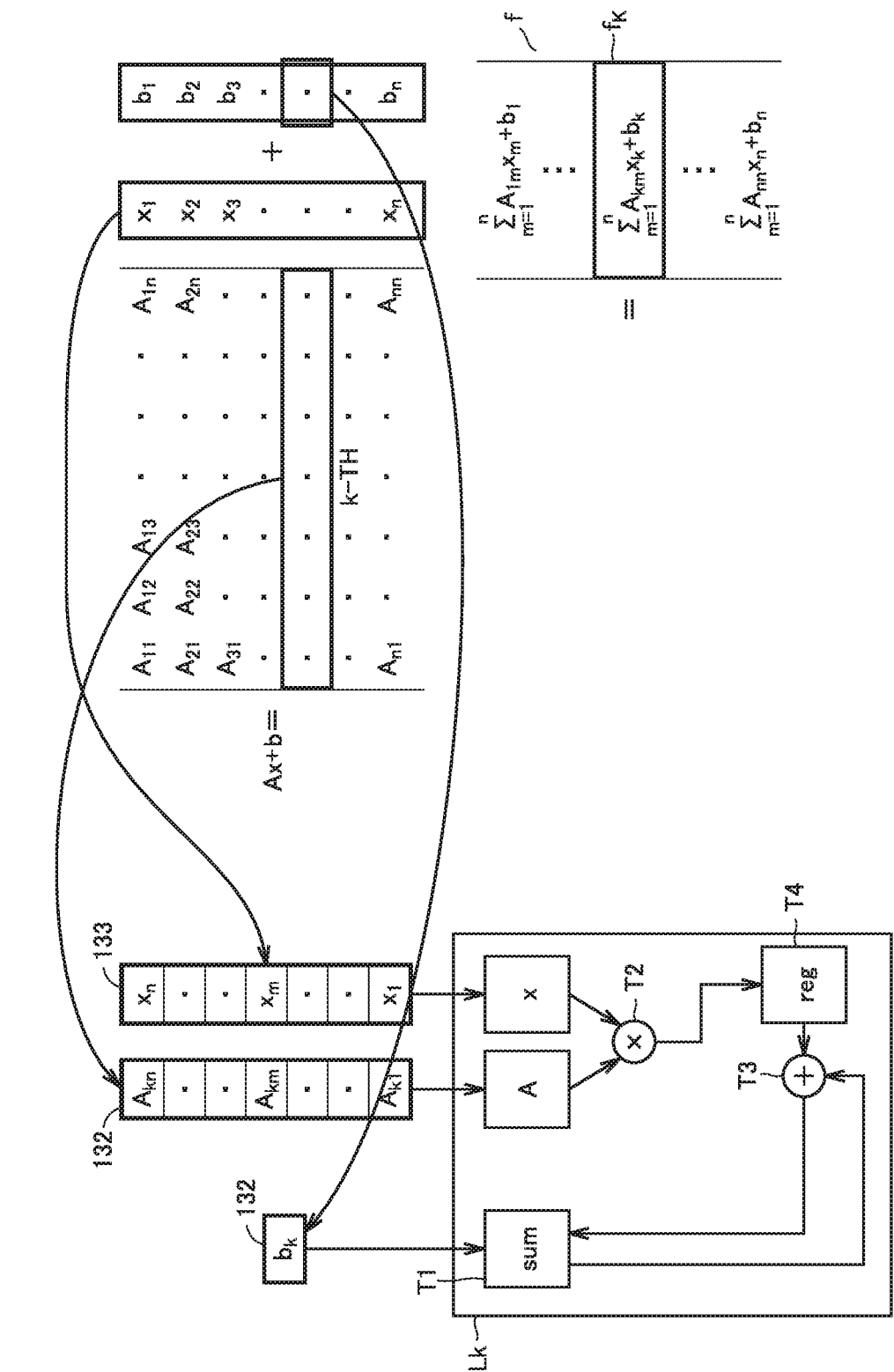
FIG. 5 is a diagram illustrating an operator CLk of FIG. 4 in association with output data.

FIG. 5 is a diagram illustrating operator CLk of FIG. 4 in association with input data and output data. Referring to FIG. 5, operator CLk includes an accumulator T1, a multiplier T2, an adder T3, and a register T4. Operator CLk is connected to a coefficient storage circuit 132 and an input storage circuit 133 which are readable from operator CLk. The "input storage circuit" is a circuit disposed between parallel operation circuit 121 and an external unit, and storing an input to parallel operation circuit 121. Coefficient storage circuit 132 and input storage circuit 133 are included in input I/F 122 of FIG. 4. While FIG. 5 shows one operator CLk among multiple operators CLk included in parallel operation unit, the other operators have the same configuration.

Coefficient storage circuit 132 stores elements $A_{k1}$ to $A_{kn}$ at the k-th row of coefficient matrix A, and element $b_k$ at the k-th of bias vector b. Input storage circuit 133 stores elements $x_1$ to $x_n$ of input vector x.

Multiply-and-Add Operation Process

In operator CLk, an initial value (e.g., 0) is pre-stored in accumulator T1 and register T4. Upon initiation of the multiply-and-add operation process, multiplier T2 reads element $A_{km}$ from coefficient storage circuit 132 and element $x_m$ from input storage circuit 133, and multiplies element $A_{km}$ by element $x_m$ to calculate a product thereof, and stores the product in register T4 by overwriting the initial value in synchronization with a clock. Adder T3 calculates the sum of the product stored in register T4 and an accumulated value sum stored in accumulator T1, and outputs the calculated sum to accumulator T1. Accumulator T1 adds element $b_k$ read from input storage circuit 133 and the sum output from adder T3, and adds the result of the addition to accumulated value sum. This completes one operation process. In this manner, the multiply-and-add operation of adding the product of: element $A_{km}$ from coefficient storage circuit 132; and element $x_m$ from input storage circuit 133 corresponding element $A_{km}$ and accumulated value sum, is repeated n times.

As such, each operator CLk repeats the multiply-and-add operation, independent of the other operators CLk, for the row assigned to the operator CLk for a number of times (m) corresponding to the total number of the sets of element $A_{km}$ stored in coefficient storage circuit 132 and element $x_m$ stored in input storage circuit 133 corresponding to element $A_{km}$. As a result, accumulated value sum in accumulator T1 of each operator CLk is output to output I/F 123 as an element $f_k$ of output vector f.

Configurations of Input I/F and Output I/F

Figure 6:
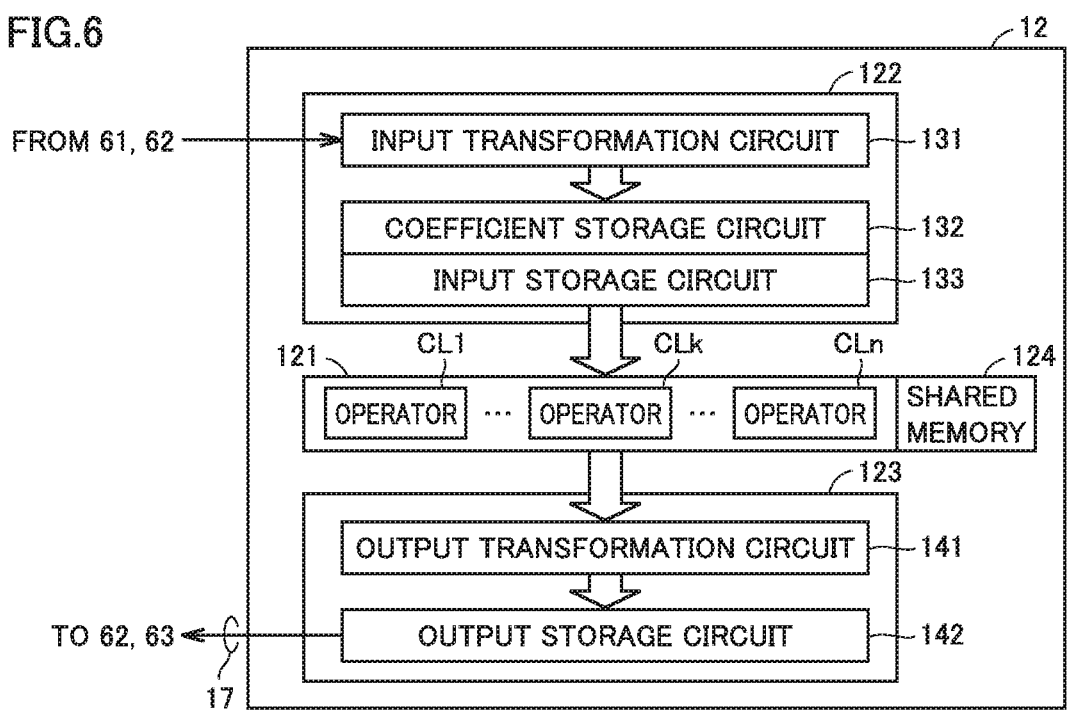
FIG. 6 is a diagram showing configurations of an input I/F and an output I/F according to Embodiment 1.

FIG. 6 is a diagram showing configurations of the input I/F and the output I/F according to Embodiment 1. FIG. 6 shows configurations of the input I/F and the output I/F in association with peripheral circuits, except for control circuit 30. In FIG. 6, parallel operation circuit 121 is connected to a shared memory 124. Shared memory 124 can be written/read to/from each operator CLk. Referring to FIG. 6, input I/F 122 includes an input transformation circuit 131, coefficient storage circuit 132, and input storage circuit 133. Output I/F 123 includes an output transformation circuit 141 and an output storage circuit 142. The "output storage circuit" is a circuit disposed between parallel operation circuit 121 and the external unit, and storing an output from parallel operation circuit 121.

Figure 7:
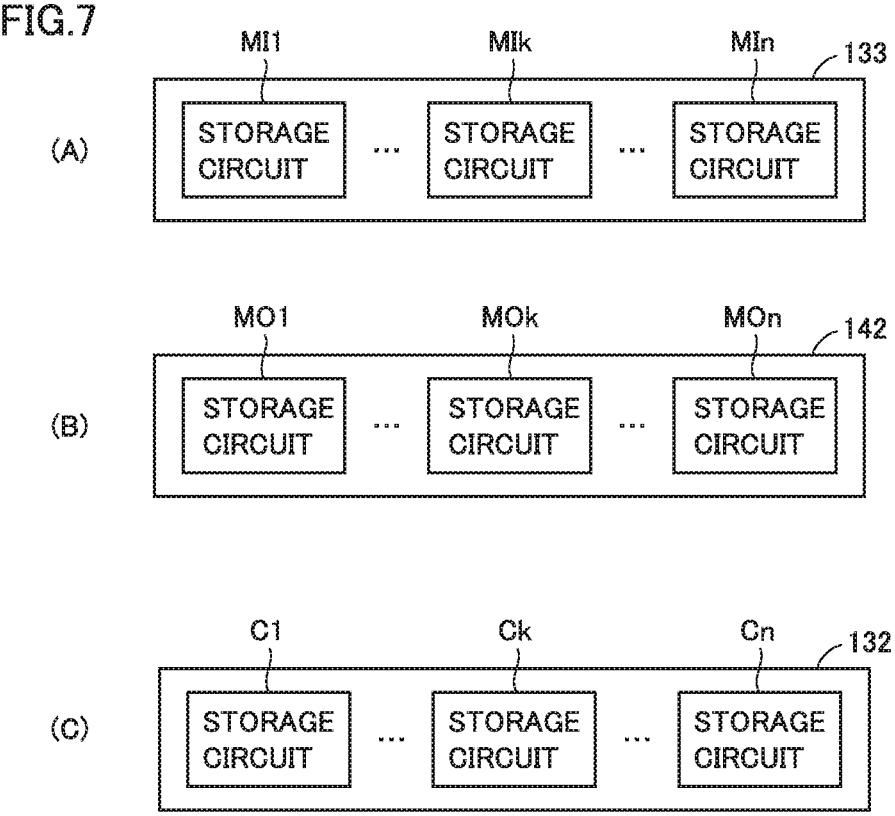
FIG. 7 is a diagram showing one example configuration of an input storage circuit, an output storage circuit, and a coefficient storage circuit, according to Embodiment 1.

FIG. 7 is a diagram showing one example configuration of the input storage circuit, the output storage circuit, and the coefficient storage circuit, according to Embodiment 1. FIG.

Figure 9:
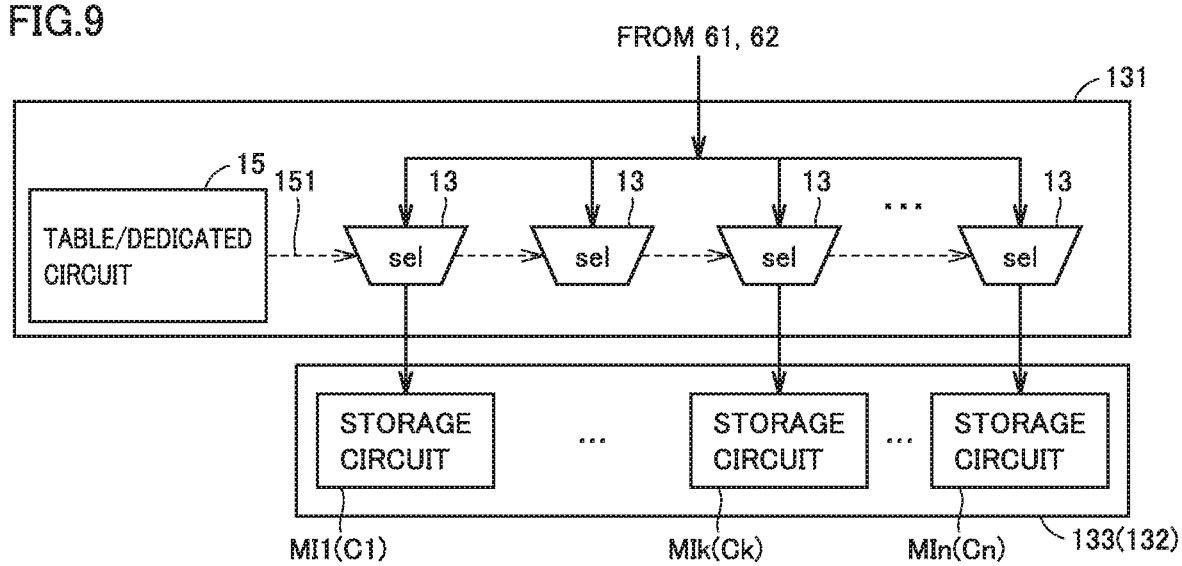
FIG. 9 is a diagram showing one example configuration of an input transformation circuit according to Embodiment 1.
Figure 10:
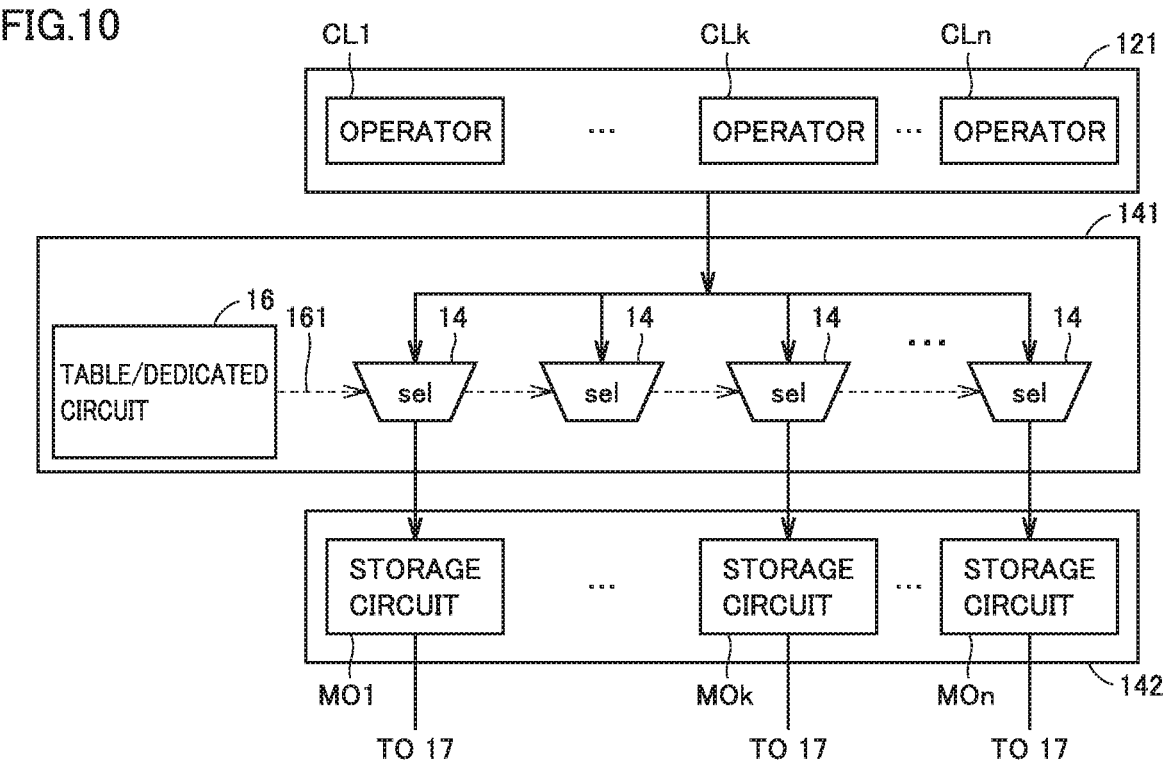
FIG. 10 is a diagram showing one example configuration of an output transformation circuit according to Embodiment 1.

8 is a diagram schematically illustrating storage schemes according to Embodiment 1. FIG. 9 is a diagram showing one example configuration of an input transformation circuit according to Embodiment 1. FIG. 10 is a diagram showing one example configuration of an output transformation circuit according to Embodiment 1.

Referring to (A) of FIG. 7, input storage circuit 133 includes multiple storage circuits MIk (k=1, 2, 3, . . . ). Multiple storage circuits MIk are provided in one-to-one correspondence with operators CLk, that is, they are provided in one-to-one correspondence with the rows of input vector x, and can be read from corresponding operators CLk. Storage circuits MIk each include multiple registers for storing elements $x_j$ of input vector x.

Referring to (B) of FIG. 7, output storage circuit 142 includes multiple storage circuits MOk (k=1, 2, 3, . . . ). Elements $f_i$ of output vector f can be written/read to/from multiple storage circuits MOk.

Referring to (C) of FIG. 7, coefficient storage circuit 132 includes multiple storage circuits Ck (k=1, 2, 3, . . . ). Multiple storage circuits Ck are provided in one-to-one correspondence with operators CLk, that is, they are provided in one-to-one correspondence with the rows of coefficient matrix A, and can be read from corresponding operators CLk. Storage circuits Ck each include multiple registers for storing element $b_i$ of bias vector b and elements $A_{ij}$ of coefficient matrix A, as shown in (B) of FIG. 8, for example.

Input Transformation Circuit

Input transformation circuit 131 has a configuration as shown in FIG. 9, for example. Referring to FIG. 9, input transformation circuit 131 includes selectors 13 corresponding to coefficient storage circuits 132 and input storage circuits 133, and a table or dedicated circuit 15. Table/dedicated circuit 15 outputs a selection command 151 to each selector. Selection command 151 indicates which element $A_{ij}$ of coefficient matrix A, element $x_j$ of input vector x, and element $b_i$ of bias vector b from external storage device 62 or external input device 61 are to be selected and written to a storage circuit corresponding to the elements. Selection command 151 includes, for example, values of indices of element $A_{ij}$, element $x_j$, and element $b_i$.

Specifically, as input transformation circuit 131 receives element $A_{ij}$, element $x_j$, and element $b_i$ from external storage device 62 or external input device 61, each selector 13 selects the elements in accordance with the indices of received element $A_{ij}$, element $x_j$, and element $b_i$ and selection command 151, and writes the selected element $A_{ij}$, element $x_j$, and element $b_i$ into corresponding storage circuit MIk or corresponding storage circuit Ck corresponding to element $A_{ij}$. At this time, selector 13 selects only non-zero element $A_{ij}$ by selection command 151, among elements $A_{ij}$. Selector 13 then stores the selected element $A_{ij}$ and element $b_i$ into corresponding storage circuit Ck.

Each selector 13 included in input transformation circuit 131 also selects element $x_j$ to be stored into corresponding storage circuit MIk, in accordance with the index of element $x_j$ received from external storage device 62 or external input device 61, and selection command 151. In this selection, selector 13 selects only element $x_j$ corresponding to non-zero element $A_{ij}$, in accordance with selection command 151. Selector 13 stores the selected element $x_j$ into corresponding storage circuit MIk.

Moreover, when storing element $x_j$ into storage circuit MIk and non-zero element $A_{ij}$ into storage circuit Ck, selector 13, included in input transformation circuit 131, stores the element into a register of the corresponding storage circuit, in accordance with an order of the element indicated by the index of the element. Specifically, among multiple registers of storage circuits Ck, selector 13 stores element $A_{ij}$ into a register that is addressed using, as an address, a value (numeric value) that is indicated by the index of element $A_{ij}$. Selector 13 also stores element $b_i$ into a predetermined register among the multiple registers included in storage circuit Ck, the predetermined register being different from the register storing element $A_{ij}$. Similarly, selector 13 stores element $x_j$ into a register, among the multiple registers included in storage circuit MIk, which is addressed using, as an address, a value (numeric value) indicated by the index of the element $x_j$.

This stores, into storage circuit Ck and storage circuit MIk, elements $x_j$, non-zero elements $A_{ij}$, and element $b_i$ that are used for multiply-and-add operations by operator CLk corresponding to the storage. Moreover, non-zero elements $A_{ij}$ are stored in storage circuit Ck in an order in which they are operated, and elements $b_i$ corresponding to non-zero elements $A_{ij}$ are stored in each storage circuit MIk in an order in which they are operated.

Table/Dedicated Circuit Included in Input Transformation Circuit

In Embodiment 1, (i) a row of coefficient matrix A to which each operator CLk is assigned and (ii) the location of element $x_j$ in input vector x to be operated by using non-zero element $A_{ij}$ are predetermined. Accordingly, table/dedicated circuit 15 stores information indicating details of such predetermined content, and the dedicated circuit generates selection command 151 directed to each selector 13 according to the store information, and outputs the generated selection command 151 to the selector 13. Note that if the assignment of a row of coefficient matrix A to operator CLk, and the location of element $x_j$ in input vector x to be operated using non-zero element $A_{ij}$ remain unchanged, table/dedicated circuit 15 can be configured as a fixed circuit.

Output Transformation Circuit

Output transformation circuit 141 has a configuration as shown in FIG. 10, for example. Referring to FIG. 10, output transformation circuit 141 includes multiple selectors 14, and a table/dedicated circuit 16. Multiple selectors 14 correspond to multiple storage circuits MOk included in output storage circuit 142. Storage circuits MOk each include one or more registers.

Outputs $f_i$ stored in output storage circuit 142 are output to external storage device 62 or external output device 63. The number of outputs $f_i$ that can be simultaneously output from output storage circuit 142 to external storage device 62 or external output device 63 is predetermined. Accordingly, output storage circuit 142 has the same number of storage circuits MOk as the number of outputs $f_i$ that can be simultaneously output from output storage circuit 142. Multiple storage circuits MOk are each connected to external storage device 62 or external output device 63 via port 17.

Each selector 14 included in output transformation circuit 141 determines a storage circuit MOk among multiple storage circuits MOk (i.e., one of multiple ports 17), based on selection command 161 from table/dedicated circuit 16 and a value of the index of output $f_i$ from parallel operation circuit 121, and stores the output $f_i$ into the determined storage circuit MOk. In the present embodiment, the index of output $f_i$ also serves as an identifier identifying the output $f_i$. Selector 14 determines an address based on selection command 161 and the index of output $f_i$, and stores the output $f_i$ into a register of storage circuit MOk that is addressed by the determined address.

In general, (i) an operator CLk from which outputs $f_i$, which are operation results for each row of coefficient matrix A, are derived, (ii) a port 17 from which the outputs $f_i$ are to be sent out, and (iii) reference information defining an order in which outputs $f_i$ are sent out are predetermined.

Table/dedicated circuit 16 stores the above reference information. Based on the stored reference information, table/dedicated circuit 16 generates selection command 161 directed to each selector 14, and outputs the generated selection command 161 to the selector 14.

Note that when rows of coefficient matrix A are in one-to-one correspondence with operators CLk, operators CLk and storage circuits MOk can be directly coupled in one-to-one correspondence, in which case there may be one location (capacity, the number of registers) at which outputs $f_i$ are stored in each storage circuit MOk.

Table/dedicated circuit 16 outputs, to each selector 14, selection command 161 indicating which one of elements $f_i$, which are operation results from parallel operation circuit 121, to be selected and written to storage circuit MOk corresponding to the selector 14. Selection command 161 includes, for example, a value of the index of element $f_i$.

Specifically, selector 14 selects an element $f_i$ based on selection command 161, from among elements $f_i$ from operators CLk included in parallel operation circuit 121, and stores the selected element $f_i$ into storage circuit MOk corresponding to the selector 14. Each storage circuit MOk includes multiple registers. When storing elements $f_i$ into storage circuit MOk, output transformation circuit 141 stores elements $f_i$ into the registers included in storage circuit MOk in an order in accordance with selection command 161.

Selection command 161 from table/dedicated circuit 16 described above is predetermined based on (i) the location (an address) of output storage circuit 142 at which external storage device 62 or external output device 63 expects output (element $f_i$) from parallel operation circuit 121 to be stored or (ii) an order in which external storage device 62 or external output device 63 expects element $f_i$ to be read from output storage circuit 142.

While storage circuits MIk, storage circuits MOk, and storage circuits Ck each include multiple addressable registers, it should be noted that they are not limited to the configuration as including registers. For example, they may be any addressable storage circuits, and may include, for example, SRAM.

Specific Example of Association of Operator and Elements

Figure 11:
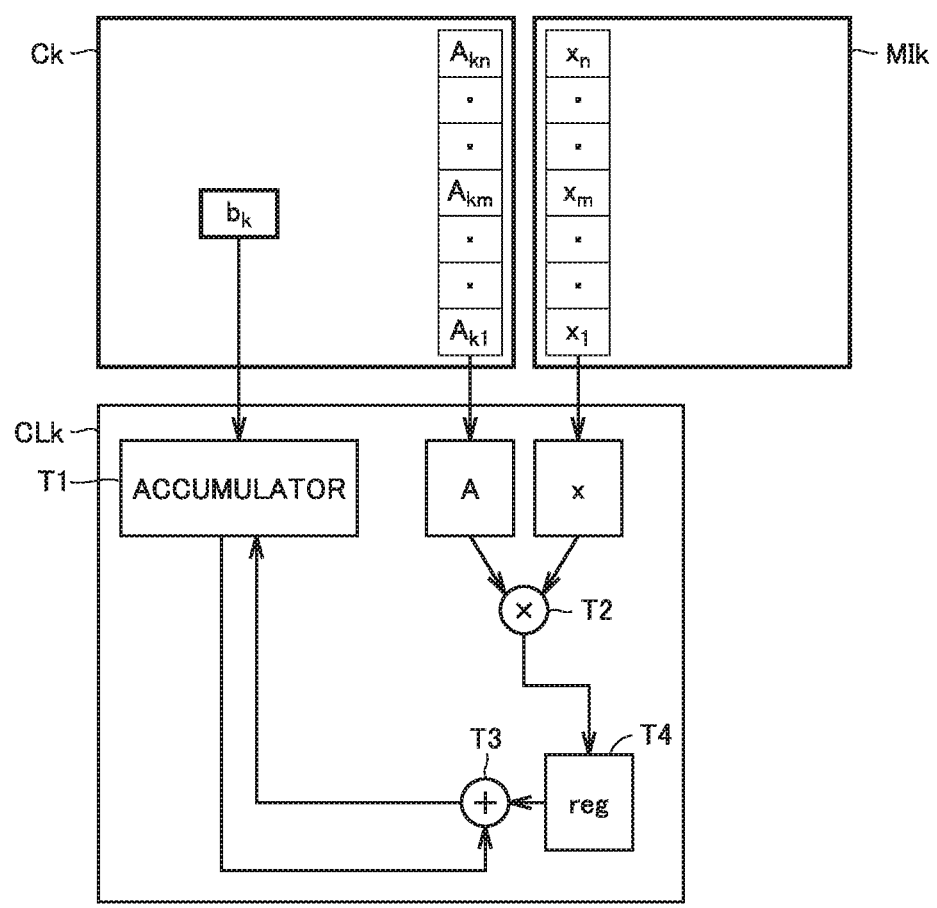
FIG. 11 is a diagram showing a specific example of associating operator CLk shown in FIG. 5 and an element to be operated.

FIG. 11 is a diagram showing a specific example of associating operator CLk shown in FIG. 5 with elements to be operated. As shown in FIG. 11, with input transformation circuit 131, non-zero elements $A_{ij}$ and elements $x_j$ to be operated by corresponding operator CLk are only stored in storage circuit Ck and storage circuit MIk in order the elements are operated.

Accordingly, multiplier T2 included in operator CLk read the elements in the order from storage circuit Ck and storage circuit MIk, thereby obtaining only elements which are to be subjected to a multiply-and-add operation by operator CLk in an order in which the elements are operated.

Owing to this, even when requests for reading elements from the operators CLk occur simultaneously, arrangement such as ordering the requests, are not required, and further, each operator CLk is not required to put the elements in an order in which they are to be multiplied. Accordingly, an overall processing speed can be accelerated, as compared to a conventional multiply-and-add operation process that requires the arrangement.

Variation of Coefficient Storage Circuit

Figure 8:
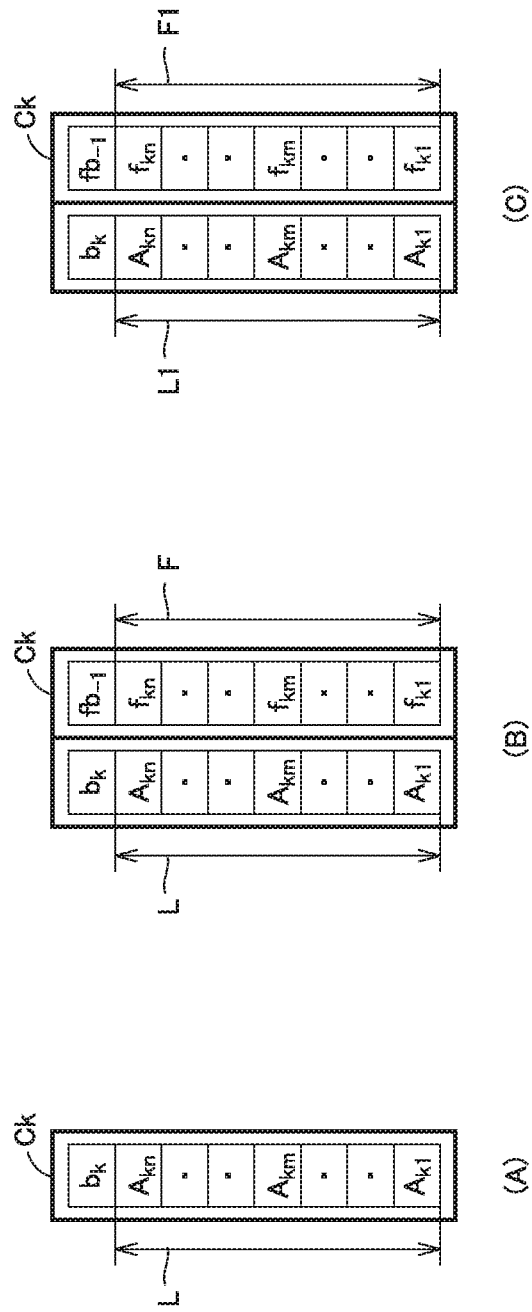
FIG. 8 is a diagram schematically illustrating storage schemes according to Embodiment 1.

Referring to FIG. 8, coefficient storage circuit 132 includes schemes for storing coefficients (elements $A_{ij}$ and elements $b_i$), the first scheme being illustrated in (A) of FIG. 8, the second scheme being illuminated in (B) of FIG. 8.

Referring to (A) of FIG. 8, the first scheme stores element $b_i$ into storage circuit Ck corresponding to operator CLk, followed by elements $A_{ij}$ corresponding to one row L of coefficient matrix A in an order indicated by the indices of elements $A_{ij}$. The first scheme illustrated in (A) of FIG. 8 also allows a coefficient read from storage circuit Ck to skip parallel operation circuit 121, and be stored into output storage circuit 142 via output transformation circuit 141.

Referring to (B) of FIG. 8, the second scheme adds original coefficient data (element $b_i$ and elements $A_{ij}$ corresponding to one row L) and a flag F designating a run mode. For example, flag F indicates to parallel operation circuit 121 a type of processing, such as an operation to be performed using each coefficient (element $A_{ij}$ or element $b_i$) stored in storage circuit Ck. In Embodiment 1, types of processing indicated by the execution flag include: calculation of a product of element $A_{ij}$ and element $x_j$; a multiply-and-add operation; loading of a coefficient (element $A_{ij}$ or element $b_i$); loading of input data (element $x_j$); writing (for example, writing of an operation result (an element $f_j$)) into shared memory 124; reading from shared memory 124; and skipping parallel operation circuit 121 and storing each coefficient (element $A_{ij}$ or element $b_i$) into output storage circuit 142 via output transformation circuit 141.

As yet another scheme, the scheme illustrated in (B) of FIG. 8 can also be modified so that storage circuit Ck can store elements $A_{ij}$ corresponding to multiple rows L1 in an order of the indices of elements $A_{ij}$.

Variations of the Components

Operation circuit 12 can be configured of an ASIC (Application Specific Integrated Circuit) or FPGA (Field Programmable Gate Array) which includes multiple operators which can perform the matrix operation indicated by the above Equation (1) by the parallel operation.

Parallel operation circuit 121, which includes multiple operators CLk, may be configured in any manner so long as parallel operation circuit 121 can perform multiple processes (e.g., multiply-and-add operations) in parallel. For example, parallel operation circuit 121 can be configured of a multi-core processor. In that case, multiple processor cores correspond to multiple operators CLk, respectively.

Moreover, in Embodiment 1, non-zero elements $A_{ij}$ in a matrix A and elements $x_j$ in an input vector corresponding to non-zero elements $A_{ij}$ can be stored into coefficient storage circuit 132 via input transformation circuit 131 upon an initialization process of operation circuit 12. Note that if non-zero elements $A_{ij}$ in matrix A and elements $x_j$ in the input vector corresponding to non-zero elements $A_{ij}$ are fixed values, coefficient storage circuit 132 can include a read only memory (ROM) storing the values of non-zero elements $A_{ij}$ and corresponding elements $x_j$.

In order to accelerate the computation of the product of matrix A and vector x, two or more operators CLk may perform multiply-and-add operations for one row of matrix A. In that case, output storage circuit 142 can be used to store operation results of operators CLk in order to obtain the sum of the operation results of operators CLk.

Moreover, a configuration that is specialized for a convolution operation which can avoid redundant reading or referencing to input data may be added between input transformation circuit 131 included in operation circuit 12 and external storage device 62 or external input device 61.

Moreover, due to matrix A as being small in size, the process for extracting, as input vector x, an image portion of an image from the line buffer assumes loading a line buffer having the same number of lines as the height of a typical convolution kernel, and loading input data from a kernel coefficient register (window). Such a line buffer may have a ring buffer structure in which the data is loaded in a Raster scan order, and once a line of data is loaded, the oldest line is used to load the next data.

Flowchart of the Entire Process

Figure 12:
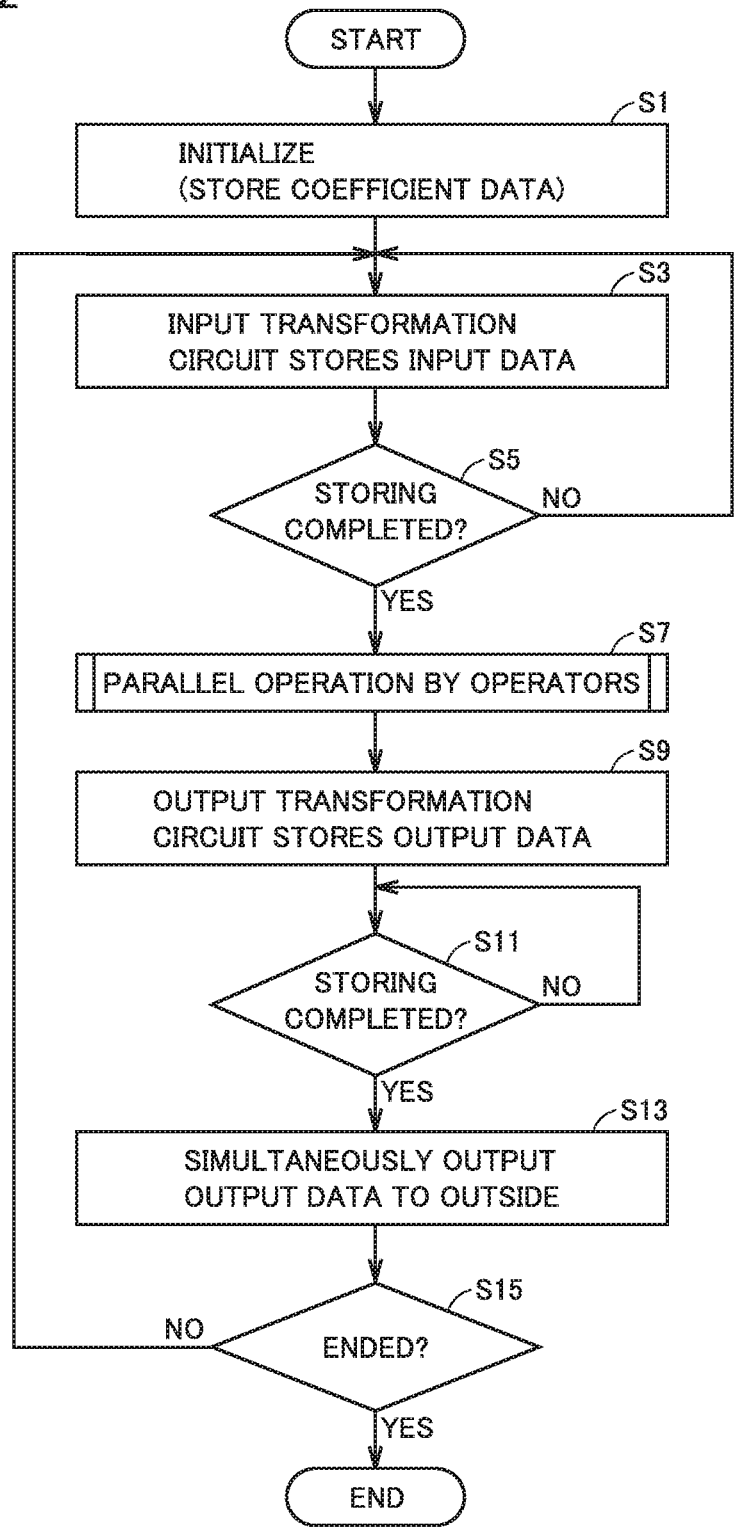
FIG. 12 is a flowchart illustrating parallel processing according to Embodiment 1.

FIG. 12 is a flowchart illustrating the parallel processing according to Embodiment 1. The processing according to the flowchart of FIG. 12 is stored as control program 150 in memory 32 of control circuit 30. Processor 31 reads control program 150 out of memory 32 and executes control program 150.

The processing in FIG. 12 will be described, with reference to FIG. 6. Initially, processor 31 performs an initialization process (step S1).

Specifically, in the initialization process, processor 31 activates and causes input transformation circuit 131 to perform an initialization process. Input transformation circuit 131 stores non-zero elements $A_{ij}$ in coefficient matrix A from external storage device 62 or external input device 61 and element $b_i$ in bias vector b into multiple storage circuits Cn included in coefficient storage circuit 132. Specifically, as described with reference to FIG. 9, selector 13 corresponding to storage circuit Cn stores the selected elements $A_{ij}$ and element $b_i$ into storage circuit Cn corresponding to the elements, based on the indices of elements $A_{ij}$ and element $b_i$, and selection command 151.

Once the initialization process finishes, operation circuit 12 transitions to a normal process. In the normal process, if processor 31 included in control circuit 30 determines that elements $x_1, \ldots, x_m$ of input vector x have been output from external storage device 62 or external input device 61 to operation circuit 12, processor 31 causes input transformation circuit 131 to store the elements $x_1, \ldots, x_m$ into input storage circuit 133 (step S3). Specifically, as described with reference to FIG. 9, based on the indices of elements $x_1, \ldots, x_m$ and selection command 151, selector 13 stores the selected element $x_j$ into a corresponding storage circuit MIk.

Processor 31 included in control circuit 30 determines whether the process of storing, by selector 13, the elements $x_1, \ldots, x_m$ of vector x into corresponding storage circuit MIk has been completed (step S5). If processor 31 determines that the storing has not been completed (NO at step S5), the process returns to step S3. If processor 31 determines that the storing has been completed (YES at step S5), the process transitions to step S7. If the storing has been completed (YES at step S5), non-zero elements $A_{ij}$ are stored in each storage circuit Ck in an order in which they are to be operated, and elements $b_i$ corresponding to non-zero elements $A_{ij}$ are stored in each storage circuit MIk in an order in which elements $b_i$ are to be operated.

Processor 31 included in control circuit 30 causes parallel operation circuit 121 to perform the operations (step S7). Here, a case will be described in which coefficient data (non-zero elements $A_{ij}$ and elements $b_i$) are stored in storage circuit Ck, in accordance with the first scheme illustrated in (A) of FIG. 8.

Each operator CLk included in parallel operation circuit 121 repeatedly computes, for each element $A_{ij}$ stored in corresponding storage circuit Ck, a product of non-zero element $A_{ij}$ read from the location (an address) in storage circuit Ck and element $x_j$ read from an address, corresponding to the address of non-zero element $A_{ij}$, in corresponding storage circuit MIk to complete the above (the multiply-and-add operation process). The multiply-and-add operation processes are performed at all the operators CLk simultaneously (in parallel).

Once the multiply-and-add operation processes have been completed at all the operators CLk, processor 31 included in control circuit 30 controls each operator CLk so that operator CLk outputs accumulated value sum (output $f_i$), which is an operation result, to output transformation circuit 141. Moreover, processor 31 controls output transformation circuit 141 using a control command (step S9) so that output $f_i$ from each operator CLk 141 is stored into each storage circuit MOk.

Processor 31 included in control circuit 30 determines whether the storing of outputs $f_i$ has been completed (step S11). If processor 31 determines that the storing has not been completed (NO at step S11), the process returns to step S11. If processor 31 determines that the storing has been completed (YES at step S11), processor 31 controls output storage circuit 142 so that output storage circuit 142 outputs outputs $f_i$, stored in each storage circuit MOk, to external storage device 62 or external output device 63 (step S13). At this time, output storage circuit 142 reads outputs $f_i$ from each storage circuit MOk in an order in which outputs $f_i$ are stored, and sends the read outputs $f_i$ to the line in an order in which outputs $f_i$ are read. Outputs $f_i$ are simultaneously sent from storage circuits MOk to external storage device 62 or external output device 63.

Processor 31 included in control circuit 30 determines whether the operation process has ended (step S15). If processor 31 determines that the operation process has ended, the process in FIG. 12 ends (YES at step S15), otherwise (NO at step S15), the process returns to step S3. Note that the determination at step S15 is made based on, for example, a command from CPU 51.

Variation of the Flowchart

While the flowchart of FIG. 12 employs the first scheme, as illustrated in (A) of FIG. 8, as the storage scheme for storage circuits Ck included in coefficient storage circuit 132, the storage scheme may be the second storage scheme in (B) of FIG. 8.

In the case of the second storage scheme, parallel operation circuit 121 performs a type of operation indicated by flag F on each element $A_{ij}$ stored in storage circuit Ck corresponding to operator CLk included in coefficient storage circuit 132, the flag F corresponding to the element $A_{ij}$. In this case also, all the operators CLk included in parallel operation circuit 121 operate simultaneously.

In the case of the second storage scheme, in order to normalize the amount of operations by operators CLk included in parallel operation circuit 121, coefficient matrix A's one row of operations may be distributed to and performed by two (or more) operators CLk. In this case, parallel operation circuit 121 calculates the sum of results of computations performed by the two (or more) operators CLk, using shared memory 124. Moreover, if the number of operators CLk, to which the operations are distributed, are not many, the number of distribution processes relative to the total number of operations is small, and the effects on the operation performance of operation circuit 12 can be disregarded.

With Embodiment 1, owing to input I/F 122, coefficient data (elements $A_{ij}$ and elements $b_i$), to be operated by each operator CLk included in parallel operation circuit 121 and input data (element $x_j$), can be stored prior to the operation in storage circuits Ck and MIk which can be read only by the operator CLk. This allows contention in accessing (reading) coefficient data and input data to be surely avoided when all the operators CLk perform operations simultaneously (in parallel), allowing an accelerated parallel processing to be performed.

Moreover, since only non-zero elements $A_{ij}$ are stored in storage circuits Ck, the product operations using elements $A_{ij}$ having a zero value, that is, unwanted multiplications can be eliminated from the multiply-and-add operations by operators CLk. This allows a reduction in time which is required from the initiation of the parallel processing of multiply-and-add operations by multiple operators CLk in parallel operation circuit 121 to obtain the elements $f_1, \ldots, f_n$ of an output vector f which is the final result of the processing.

Embodiment 2

Figure 13:
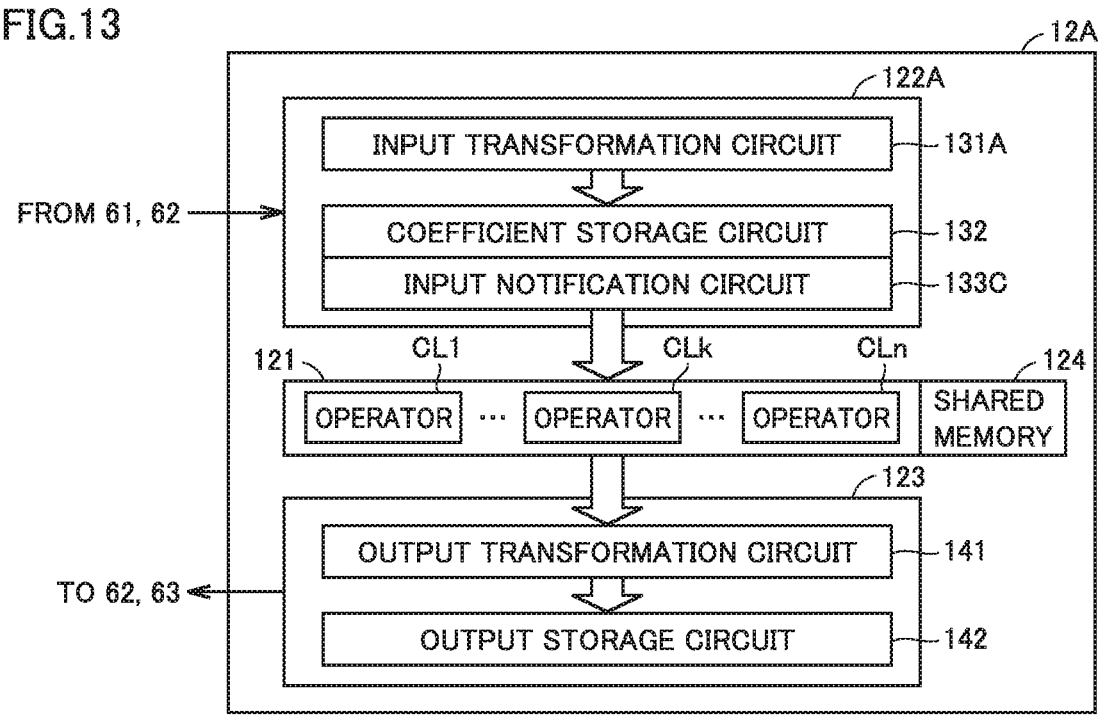
FIG. 13 is a diagram showing configurations of an input I/F and an output I/F included in an operation circuit 12A according to Embodiment 2.

Embodiment 2 is a variation of Embodiment 1. FIG. 13 is a diagram showing configurations of an input I/F and an output I/F included in an operation circuit 12A according to Embodiment 2. Operation circuit 12A in FIG. 13 has the same configuration as that shown in FIG. 6, except for having an input I/F 122A different from input I/F 122 of FIG. 6. Thus, description of the other configuration of operation circuit 12A will be omitted.

Figure 14:
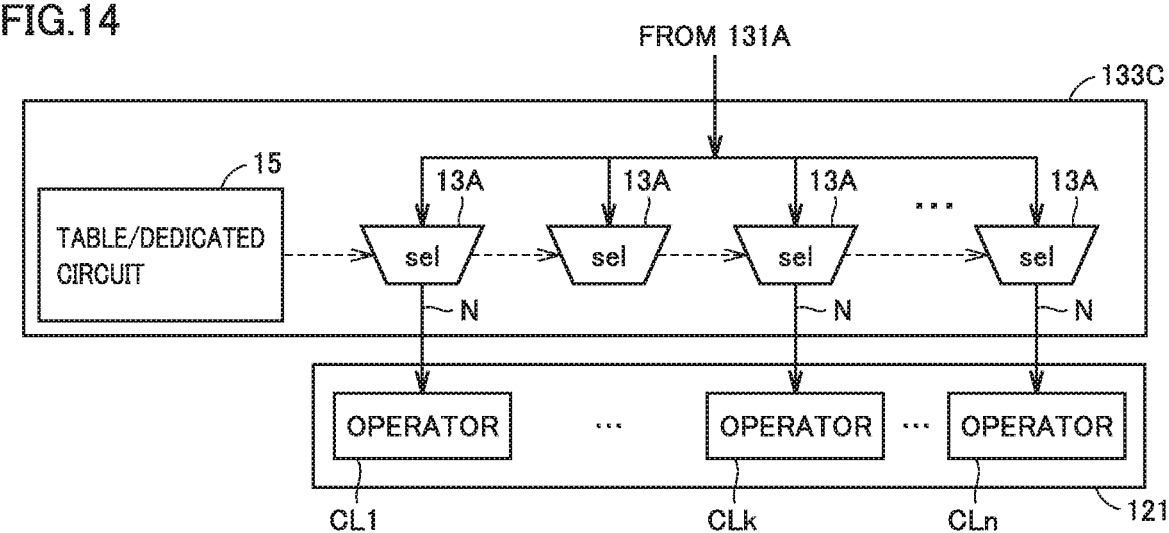
FIG. 14 is a diagram showing a configuration of an input notification circuit 133C of FIG. 13.

Referring to FIG. 13, input I/F 122A includes an input transformation circuit 131A and an input notification circuit 133C, instead of input transformation circuit 131 and input storage circuit 133. FIG. 14 is a diagram showing a configuration of input notification circuit 133C of FIG. 13. Referring to FIG. 14, input notification circuit 133C includes multiple selectors 13A having the functionality of selector 13 of FIG. 9 and a function of outputting a notification N. Selectors 13A correspond to operators CLk.

Upon receipt of elements $x_j$ of an input vector x from external input device 61 or external storage device 62, input transformation circuit 131A determines operator CLk to be used to perform operations using elements $x_j$, among multiple operators CLk, based on the indices of elements $x_j$, and outputs elements $x_j$ to only the determined operator CLk. At this time, in input notification circuit 133C of FIG. 14, selector 13A, corresponding to operator CLk determined by input transformation circuit 131A, outputs operation notification N to operator CLk. Operator CLk having received notification N reads elements $A_{ij}$ and elements $b_i$ from storage circuit Ck included in a coefficient storage circuit 132, and performs multiply-and-add operations using the read elements $A_{ij}$ and elements $b_i$, and elements $x_j$ from input transformation circuit 131.

According to Embodiment 2, for example, if elements $x_j$ are forwarded at a low speed from external input device 61 or external storage device 62 to operation circuit 12, input transformation circuit 131A directly inputs elements $x_j$ into operator CLk, instead of input storage circuit 133 storing elements $x_j$, like operation circuit 12A of FIG. 13.

This can obviate the need for a memory resource for input storage circuit 133. This further allows pausing the operator CLk, having received no notification from input notification circuit 133C, that is, operator CLk not required to perform operations using elements $x_j$. Accordingly, the circuit size and power consumption of operation circuit 12 can be reduced.

Embodiment 3

Figure 15:
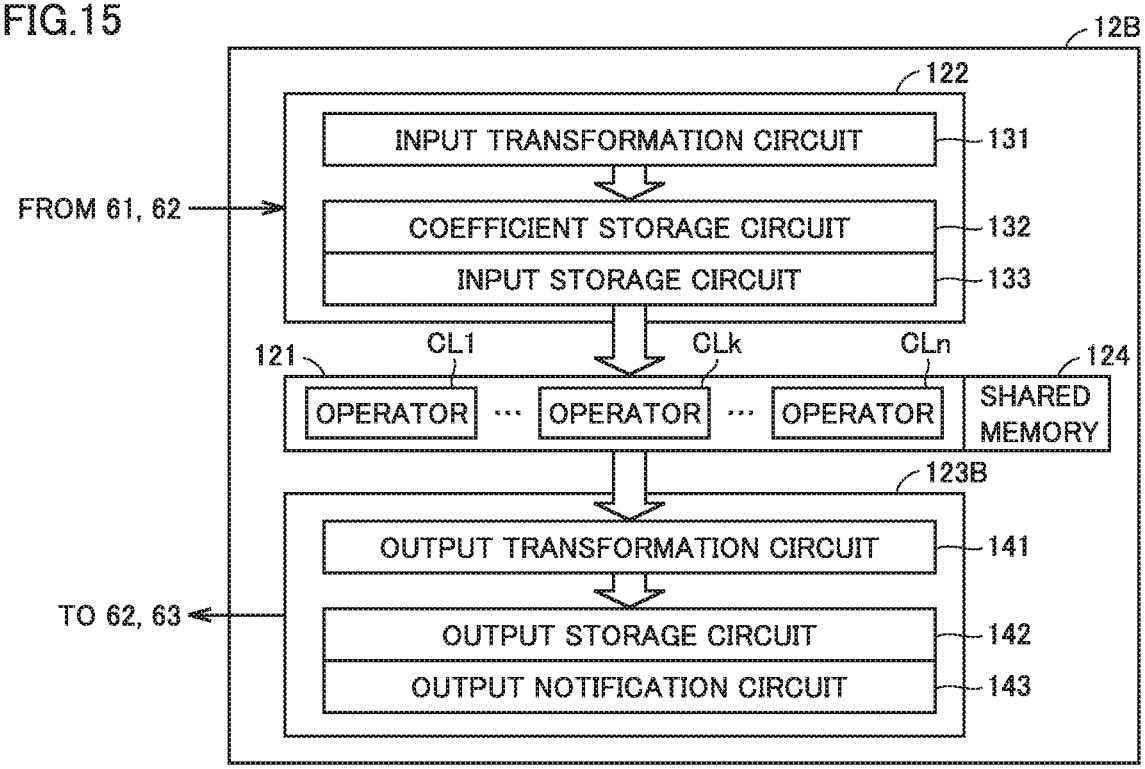
FIG. 15 is a diagram showing configurations of an input I/F and an output I/F included in an operation circuit 12B according to Embodiment 3.

Embodiment 3 is a variation of Embodiment 1. FIG. 15 is a diagram showing configurations of an input I/F and an output I/F included in an operation circuit 12B according to Embodiment 3. Operation circuit 12B in FIG. 15 has the same configuration as that shown in FIG. 6, except for having an output I/F 123B different from output I/F 123 of FIG. 6. Thus, description of the other configuration of operation circuit 12B will be omitted.

Figure 16:
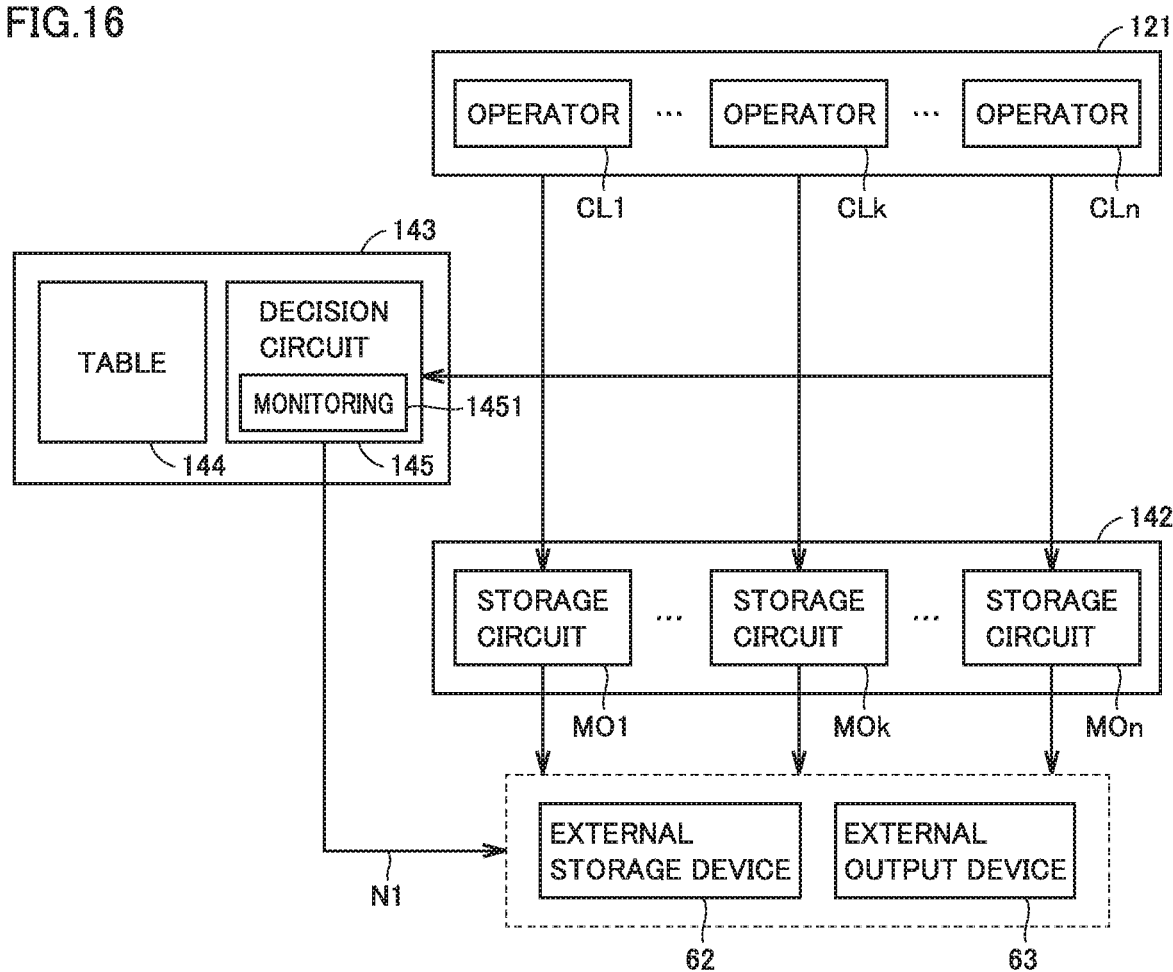
FIG. 16 is a diagram showing a configuration of an output notification circuit 143 of FIG. 15, in association with peripheral circuits.

Referring to FIG. 15, output I/F 123B includes an output transformation circuit 141, an output storage circuit 142, and an output notification circuit 143. FIG. 16 is a diagram showing a configuration of output notification circuit 143 of FIG. 15, in association with the peripheral circuits. Referring to FIG. 16, output notification circuit 143 includes a table 144 and a decision circuit 145. Table 144 stores, for example, index information identifying output $f_i$ to be sent to external storage device 62 or external output device 63. The index information indicates a type or the number of outputs $f_i$ needed by external storage device 62 or external output device 63.

Decision circuit 145 performs a monitoring process 1451 of monitoring output $f_i$ sent from each operator CLk via output transformation circuit 141. In monitoring process 1451, for example, the index of output $f_i$ is read. If decision circuit 145 determines, based on a result of the monitoring, that the type or the number of outputs $f_i$ that are needed, as indicated by the index information in table 144, are all output from parallel operation circuit 121, decision circuit 145 outputs a notification N1 to external storage device 62 or external output device 63. External storage device 62 or external output device 63 is paused until notification N1 is output from decision circuit 145, activated upon receipt of notification N1 from decision circuit 145, and receives outputs $f_i$ from output storage circuit 142.

According to Embodiment 3, for example, if data is output at a low speed from external storage device 62 or external output device 63 to bus 40, external storage device 62 or external output device 63 can be paused until notification N1 is output from output notification circuit 143, that is, in a time period in which there is no need to output data to bus 40. This allows reduction in power consumption of external storage device 62 or external output device 63.

Embodiment 4

Figure 17:
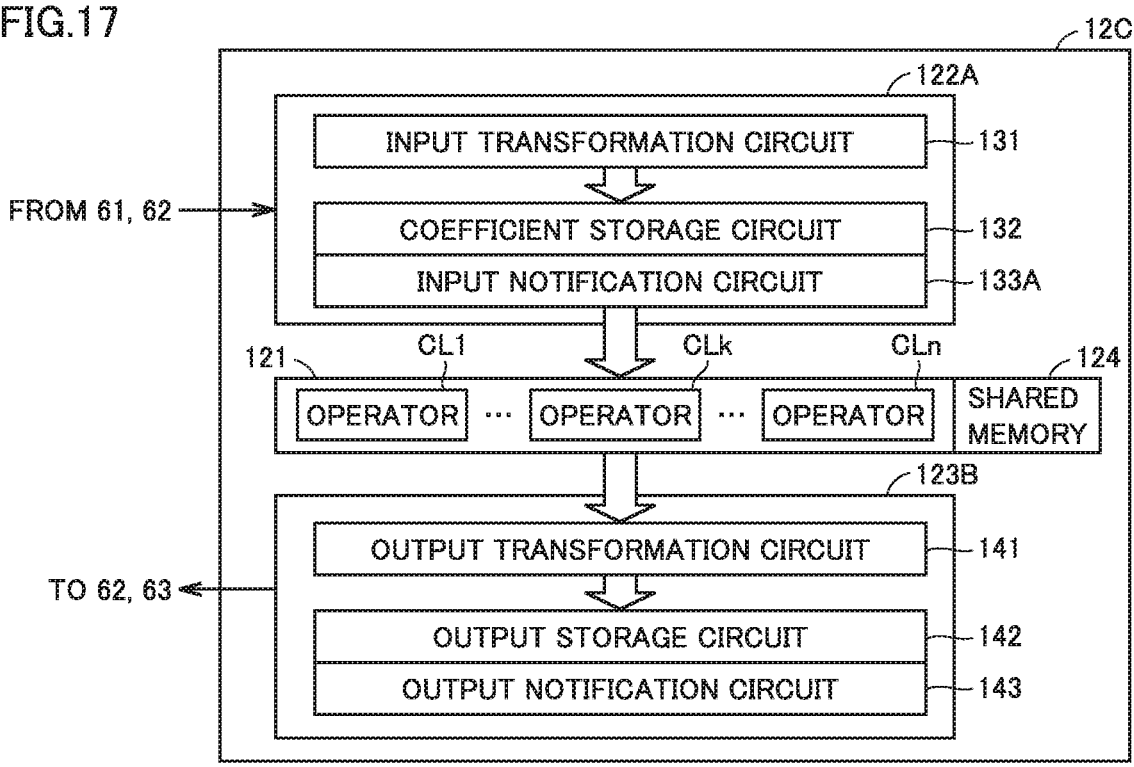
FIG. 17 is a diagram showing configurations of an input I/F and an output I/F included in an operation circuit 12C according to Embodiment 4.

Embodiment 4 is a variation of Embodiment 1. FIG. 17 is a diagram showing configurations of an input I/F and an output I/F included in an operation circuit 12C according to Embodiment 4. Operation circuit 12C in FIG. 17 includes input I/F 122A according to Embodiment 2 and output I/F 123B according to Embodiment 3.

This yields advantages effects of both Embodiments 2 and 3 if data is forwarded at a low speed from external input device 61 or external storage device 62 to operation circuit 12C or if data is output at a low speed from external storage device 62 or external output device 63 or bus 40. In other words, this can obviate the need for a memory resource for input storage circuit 133. This can further pause operator CLk that needs to perform no operation. Moreover, external storage device 62 or external output device 63 can be paused, without having it in constant operation.

Embodiment 5

Figure 18:
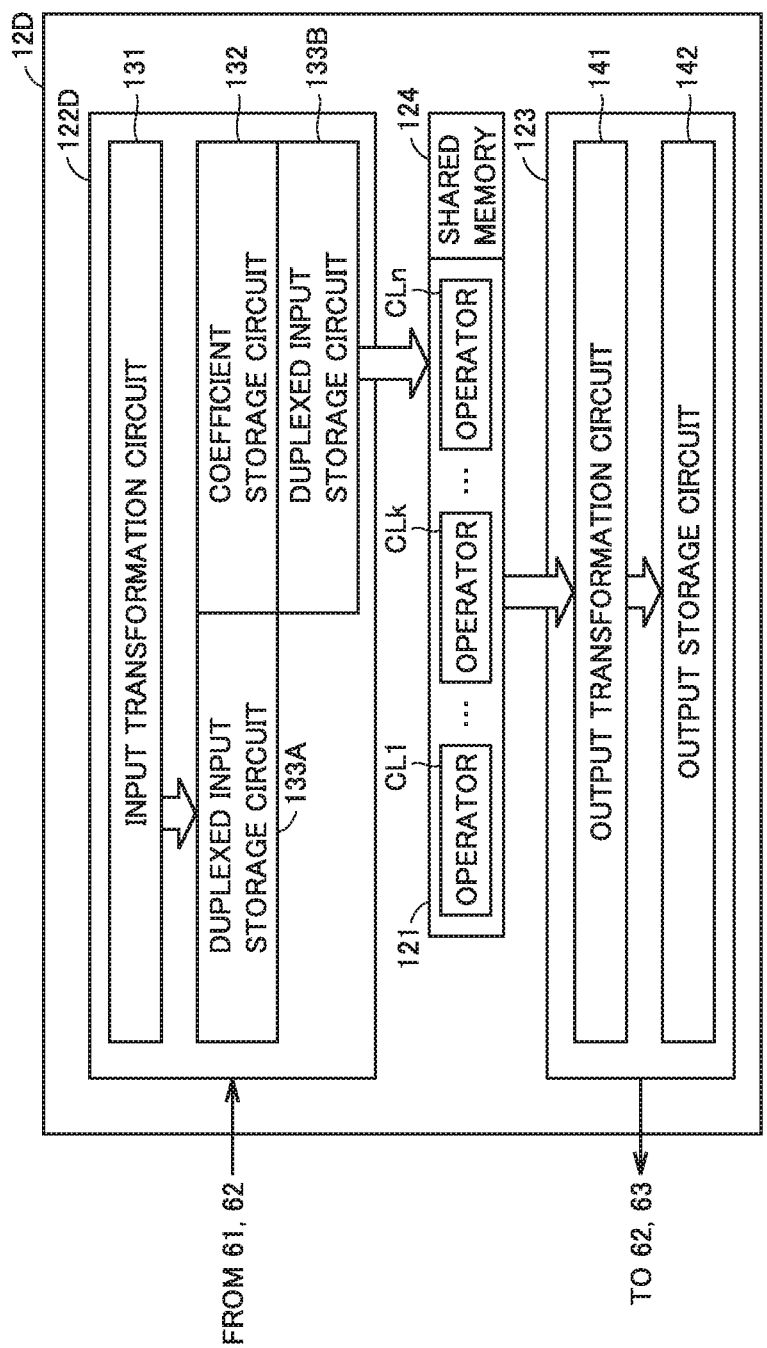
FIG. 18 is a diagram showing configurations of an input I/F and an output I/F included in an operation circuit 12D according to Embodiment 5.

Embodiment 5 is a variation of Embodiment 1. FIG. 18 is a diagram showing configurations of an input I/F and an output I/F included in an operation circuit 12D according to Embodiment 5. Operation circuit 12D in FIG. 18 has the same configuration as that shown in FIG. 6, except for having input I/F 122D different from input I/F 122 of FIG. 6. Thus, description of the other configuration of operation circuit 12D will be omitted.

Referring to FIG. 18, input I/F 122D includes an input transformation circuit 131, a coefficient storage circuit 132, a duplexed input storage circuit 133A, and a duplexed input storage circuit 133B. Input storage circuit 133 of FIG. 6 is duplexed by duplexed input storage circuits 133A, 133B. Duplexed input storage circuits 133A, 133B have the same configuration as that of input storage circuit 133 according to Embodiment 1, and are capable of operating in the same manner.

Processor 31 included in control circuit 30 switches functionality of one of duplexed input storage circuits 133A, 133B to a function of receiving elements $x_j$ from external input device 61 or external storage device 62, and functionality of the other one of duplexed input storage circuits 133A, 133B to a function of outputting elements $x_j$ to parallel operation circuit 121. As the operations by duplexed input storage circuits 133A, 133B are completed, processor 31 switches the functionality of the one of duplexed input storage circuits 133A, 133B to a function of outputting elements $x_j$ to parallel operation circuit 121, and the functionality of the other one of duplexed input storage circuits 133A, 133B to a function of receiving elements $x_j$ from external input device 61 or external storage device 62.

According to Embodiment 5, if elements $x_j$ are forwarded at a high speed from external input device 61 or external storage device 62 to operation circuit 12D, use of duplexed input storage circuits 133A, 133B allows the process of operation circuit 12D receiving elements $x_j$ from external input device 61 or external storage device 62 and the operation process by parallel operation circuit 121 to be performed simultaneously. Accordingly, the operational speed of operation circuit 12D can be accelerated.

Embodiment 6

Figure 19:
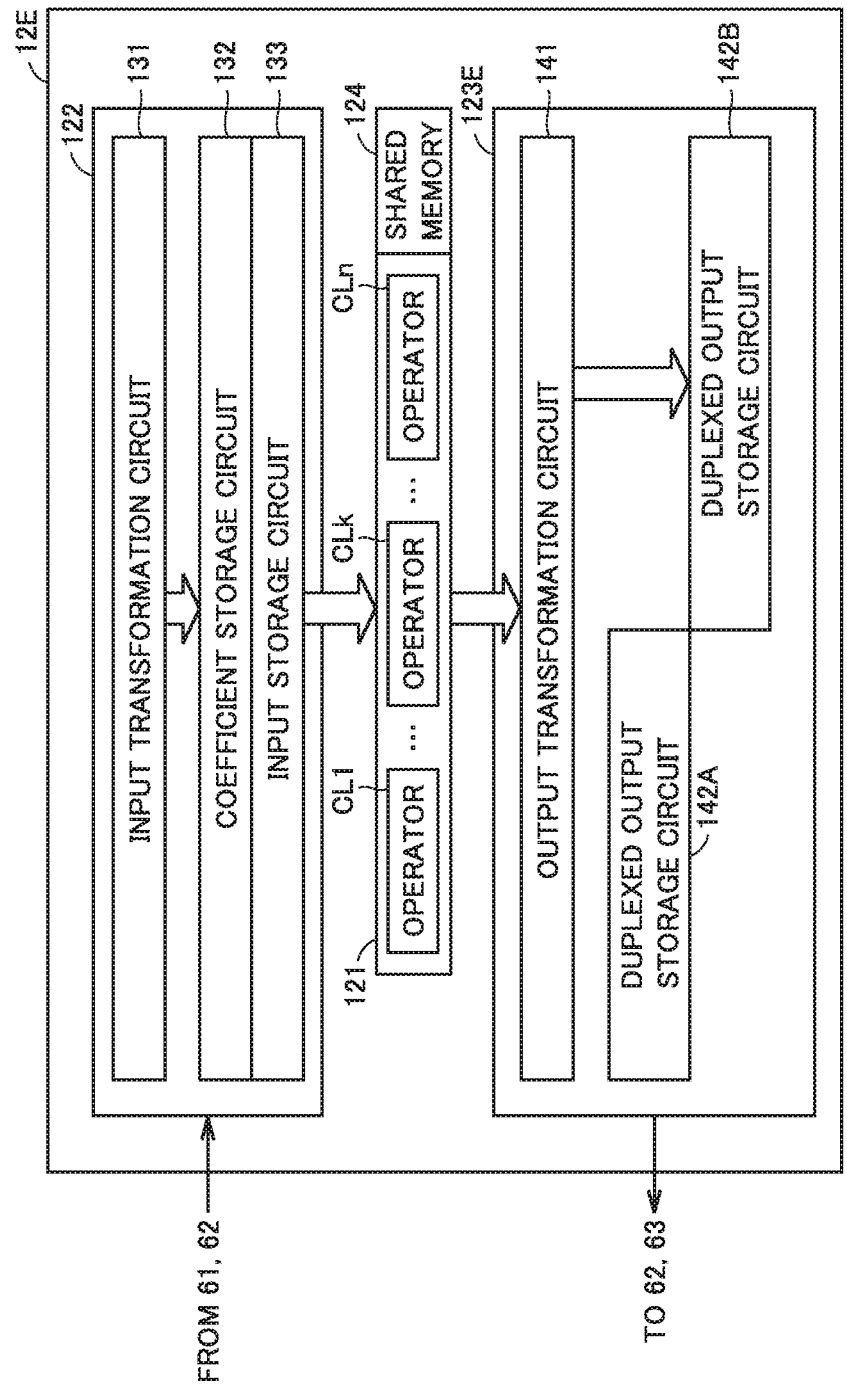
FIG. 19 is a diagram showing configurations of an input I/F and an output I/F included in an operation circuit 12E according to Embodiment 6.

Embodiment 6 is a variation of Embodiment 1. FIG. 19 is a diagram showing configurations of an input I/F and an output I/F included in an operation circuit 12E according to Embodiment 6. Operation circuit 12E in FIG. 19 has the same configuration as that shown in FIG. 6, except for having an output I/F 123E different from output I/F 123 of FIG. 6. Thus, description of the other configuration of operation circuit 12E will be omitted.

Referring to FIG. 19, output I/F 123E includes an output transformation circuit 141, a duplexed output storage circuit 142A, and a duplexed output storage circuit 142B. Output storage circuit 142 of FIG. 6 is duplexed by duplexed output storage circuits 142A, 142B. Duplexed output storage circuits 142A, 142B have the same configuration as that of output storage circuit 142 according to Embodiment 1, and are capable of operating in the same manner.

Processor 31 included in control circuit 30 switches functionality of one of duplexed output storage circuits 142A, 142B to a function of storing outputs $f_i$ from parallel operation circuit 121 via output transformation circuit 141 into storage circuits MOk, and functionality of the other one of duplexed output storage circuits 142A, 142B to a function of read outputs $f_i$ from storage circuits MOk and sending read outputs $f_i$ to external storage device 62 or external output device 63. As the operations by duplexed output storage circuits 142A, 142B are completed, processor 31 switches the functionality of the one of duplexed output storage circuits 142A, 142B to a function of reading outputs $f_i$ from storage circuits MOk and sending read outputs $f_i$ to external storage device 62 or external output device 63, and the functionality of the other one of duplexed output storage circuits 142A, 142B to a function of storing outputs $f_i$ from parallel operation circuit 121 via output transformation circuit 141 into storage circuits MOk.

Embodiment 6 can be applied to a case where, for example, outputs $f_i$ need to be sent at a high speed from operation circuit 12 to external storage device 62 or external output device 63. Specifically, the output storage circuit being duplexed allows operation circuit 12 to perform the process of outputting output $f_i$ to external storage device 62 or external output device 63 and the operation process by parallel operation circuit 121 simultaneously (in parallel), thereby further accelerating the operation process of operation circuit 12.

Embodiment 7

Figure 20:
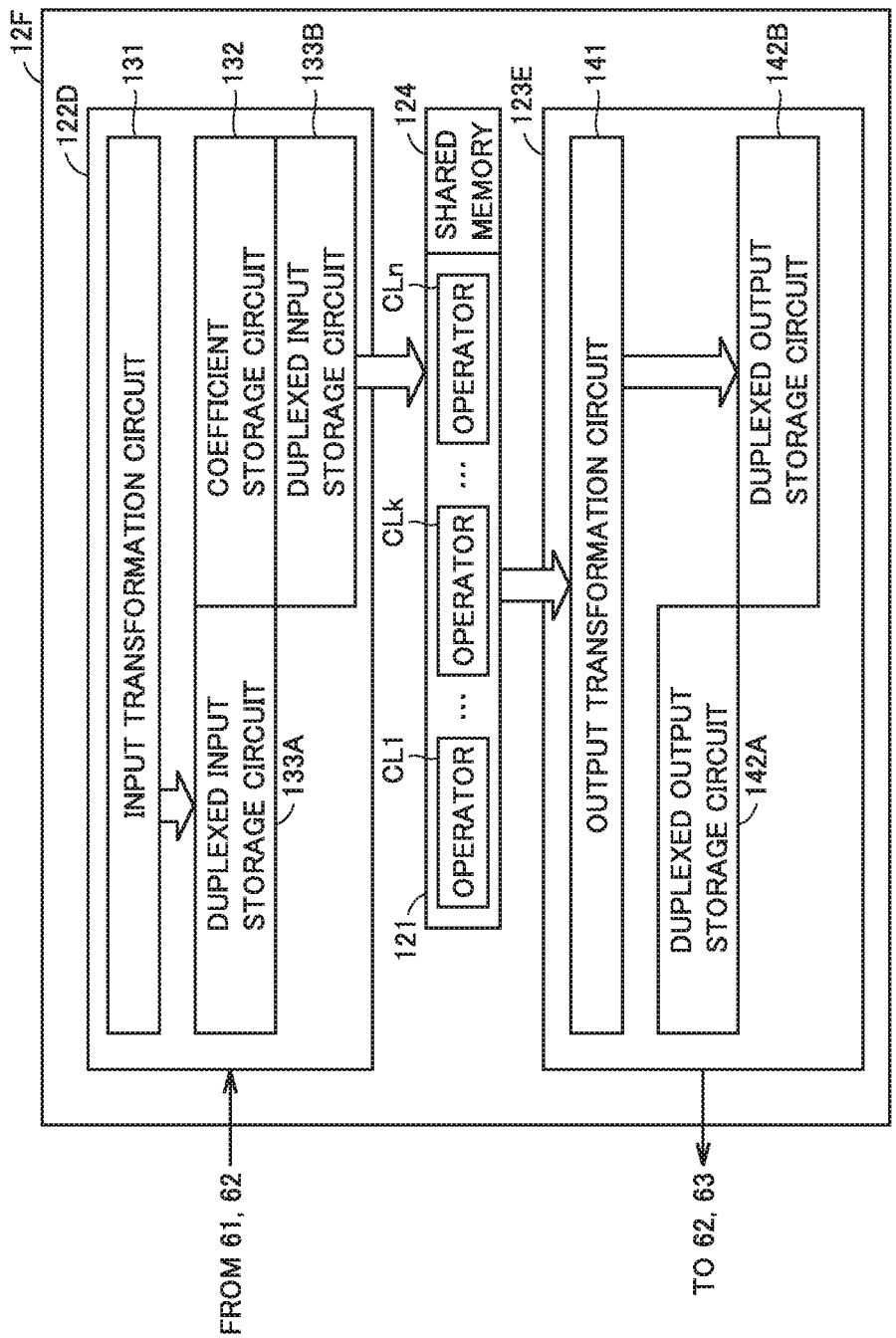
FIG. 20 is a diagram showing configurations of an input I/F and an output I/F included in an operation circuit 12F according to Embodiment 7.

Embodiment 7 is a variation of Embodiment 1. FIG. 20 is a diagram showing configurations of an input I/F and an output I/F included in an operation circuit 12F according to Embodiment 7. Operation circuit 12F in FIG. 20 includes duplexed input storage circuits 133A, 133B according to Embodiment 5 and duplexed output storage circuits 142A, 142B according to Embodiment 6.

Operation circuit 12F according to Embodiment 7 includes duplexed input storage circuits and duplexed output storage circuits. With operation circuit 12F, simultaneously: i) elements $x_j$ output at a high speed from external input device 61 or external storage device 62 can be received; ii) outputs $f_i$ can be sent at a high speed to external storage device 62 or external output device 63; and iii) operation process by parallel operation circuit 121 can be performed.

Embodiment 8

Figure 21:
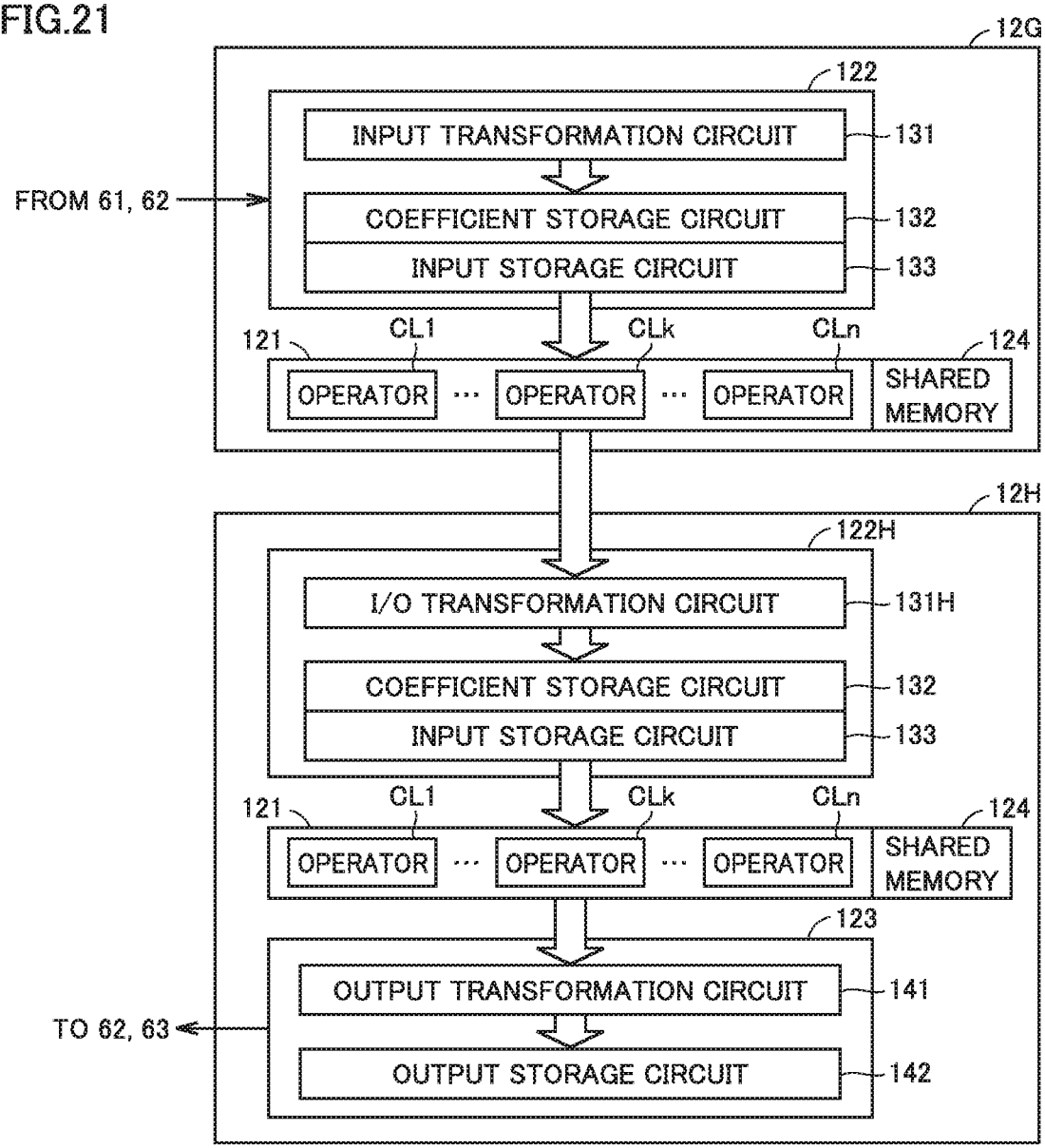
FIG. 21 is a diagram showing a configuration of an operation circuit according to Embodiment 8.

Embodiment 8 is a variation of Embodiment 1. FIG. 21 is a diagram showing a configuration of an operation circuit according to Embodiment 8. The operation circuit in FIG. 21 has an operation circuit 12G and an operation circuit 12H connected to operation circuit 12G. Operation circuit 12G is the same as operation circuit 12 according to Embodiment 1, except for not including output I/F 123 included in operation circuit 12. Operation circuit 12H includes an input I/F 122H, a parallel operation circuit 121, and an output I/F 123. Input I/F 122H includes an input/output (I/O) transformation circuit 131H, a coefficient storage circuit 132, and an input storage circuit 133. The configuration in FIG. 21 is the same as the configuration of operation circuit 12 according to Embodiment 1, except for I/O transformation circuit 131H. Thus, description of the other configuration shown in FIG. 21 will be omitted.

I/O transformation circuit 131H directly receives outputs $f_i$ from multiple operators CLk included in operation circuit 12G, and identifies, for each operator CLk of operation circuit 12H, output $f_i$ to be operated by operator CLk, among outputs $f_i$. I/O transformation circuit 131H then stores the identified outputs $f_i$ into storage circuit MIk that is included in input storage circuit 133 and corresponding to the operator CLk, in an order in which outputs $f_i$ are operated. While FIG. 21 shows two operation circuits 12 connected together, three or more operation circuits may be connected.

According to Embodiment 8, two or more operation circuits 12 can be connected together. For example, two or more operation circuits 12 can be connected together within an LSI (Large-Scale Integration) circuit. As such, when two or more operation circuits 12 are connected, if I/O transformation circuit 131H is included in the connecting portion connecting the operation circuits, the two processes by output transformation circuit 141 and input transformation circuit 131 using selectors 14 (or selectors 13) can be done by one process by I/O transformation circuit 131H. Accordingly, the process can be accelerated although multiple operation circuit are connected together.

Embodiment 9

Figure 22:
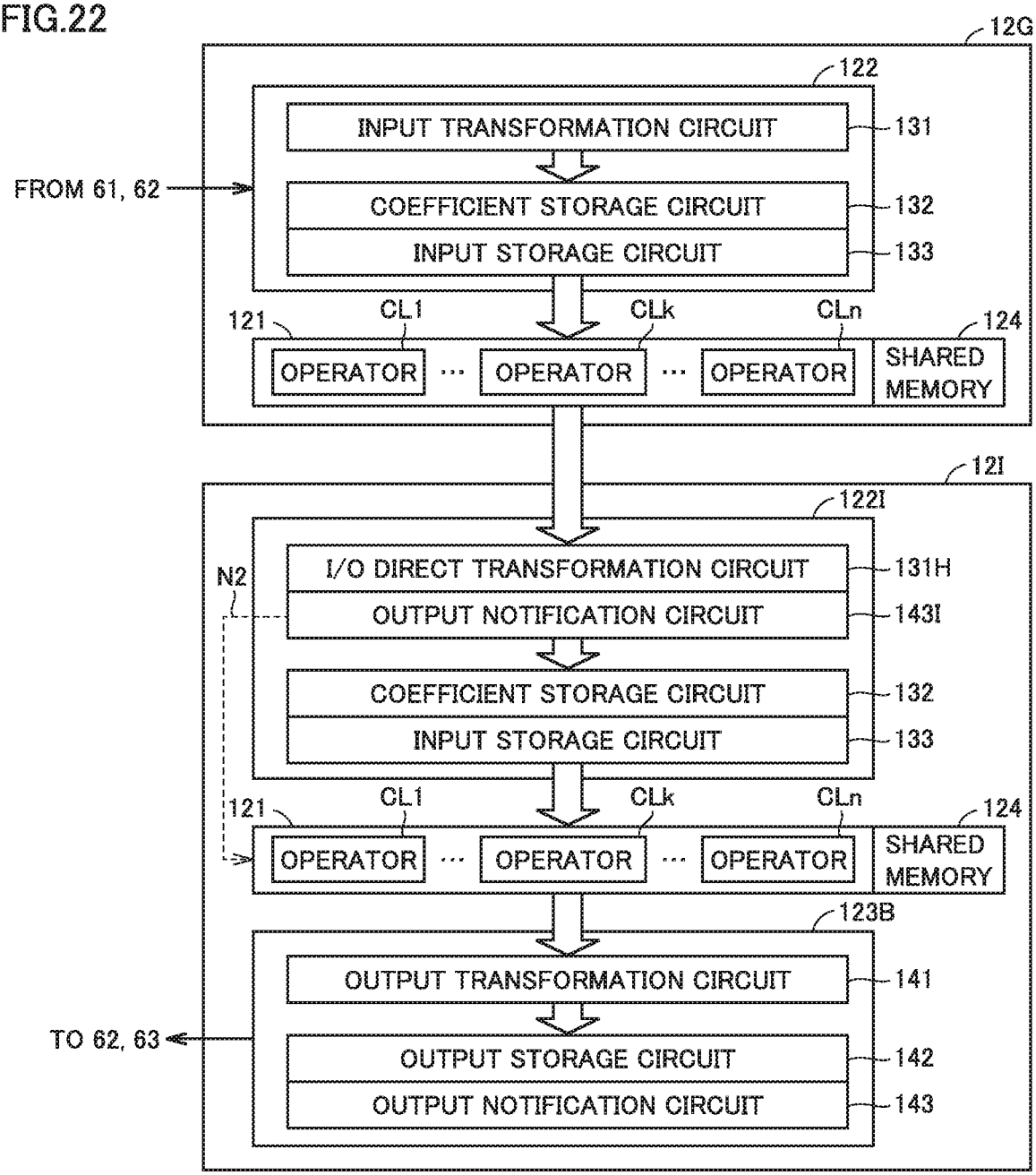
FIG. 22 is a diagram showing a configuration of an operation circuit according to Embodiment 9.

Embodiment 9 is a variation of Embodiment 1. FIG. 22 is a diagram showing a configuration of an operation circuit according to Embodiment 9. The operation circuit in FIG. 22 has an operation circuit 12G and an operation circuit 12I connected to operation circuit 12G. Operation circuit 12G has the same configuration as operation circuit 12 according to Embodiment 1, except for not including output I/F 123. Thus, description of the other configuration of operation circuit 12G will be omitted.

Operation circuit 12I includes an input I/F 122H, a parallel operation circuit 121, and an output I/F 123B. Parallel operation circuit 121 and output I/F 123B are the same as those according to Embodiment 3. Input I/F 122I includes I/O transformation circuit 131H, output notification circuit 143I, coefficient storage circuit 132, and input storage circuit 133 which are according to Embodiment 8. Since I/O transformation circuit 131H, coefficient storage circuit 132, and input storage circuit 133 are the same as those according to Embodiment 3 or 8, the description thereof will be omitted.

Output notification circuit 143I outputs a notification N2 to each operator CLk included in operation circuit 12I. Specifically, before I/O transformation circuit 131H stores outputs $f_i$ from multiple operators CLk included in the preceding operation circuit 12G into storage circuits MIk corresponding to operators CLk included in operation circuit 12I, output notification circuit 143I determines whether each storage circuit MIk is storing another output $f_i$ to be operated prior to the above output $f_i$. Output notification circuit 143I makes this determination based on, for example, the index of output $f_i$. If output notification circuit 143I determines that all outputs $f_i$ to be operated earlier are stored in the storage circuit MIk, output notification circuit 143I outputs notification N2 to operator CLk corresponding to storage circuit MIk. This allows operator CLk to initiate a multiply-and-add operation upon receipt of notification N2 indicating that all the elements $x_j$ (i.e., outputs $f_i$) that are necessary for initiating the multiply-and-add operation are stored in a corresponding storage circuit MIk.

While two operation circuit 12 are connected in FIG. 22, it should be noted that three or more operation circuit 12 may be connected.

According to Embodiment 9, two or more operation circuits 12B according to Embodiment 3 can be connected together. For example, two or more operation circuits 12B are connected together within an LSI circuit, if I/O transformation circuit 131H is included in the connecting portion connecting the operation circuits 12B, the two processes by output transformation circuit 141 and input transformation circuit 131 can be done by one process by I/O transformation circuit 131H. Accordingly, the process can be accelerated even if multiple operation circuits are connected together.

Embodiment 10

Figure 23:
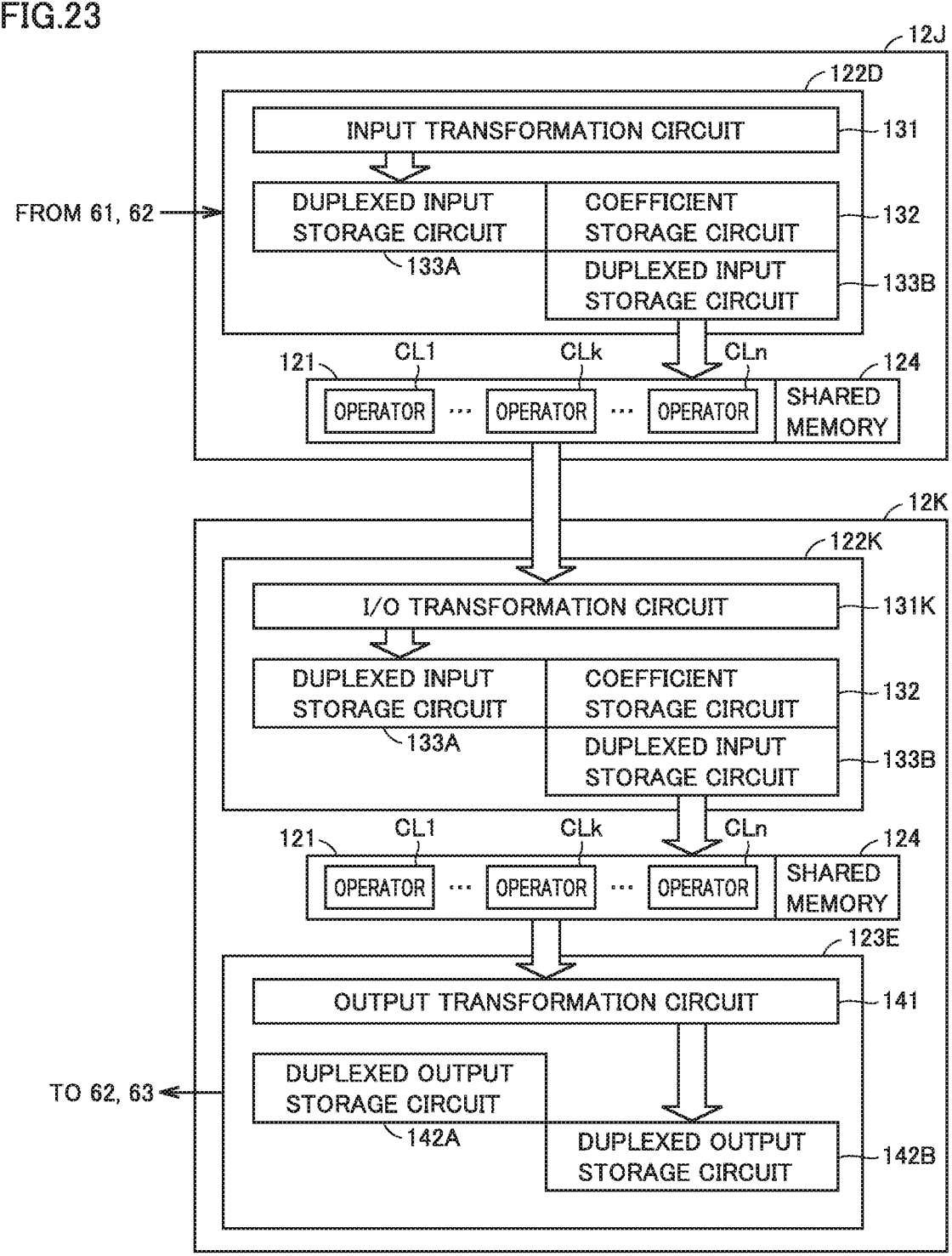
FIG. 23 is a diagram showing a configuration of an operation circuit according to Embodiment 10.

Embodiment 10 is a variation of Embodiment 1. FIG. 23 is a diagram showing a configuration of an operation circuit according to Embodiment 10. The operation circuit in FIG. 23 has an operation circuit 12J and an operation circuit 12K connected to operation circuit 12J. Since operation circuit 12J has the same configuration as operation circuit 12F, except for not including output I/F 123E in operation circuit 12F according to Embodiment 7. Thus, description of the other configuration of operation circuit 12J will be omitted. Operation circuit 12K also includes an input I/F 122K, a parallel operation circuit 121, and an output I/F 123E. Input I/F 122K includes an I/O transformation circuit 131K, duplexed input storage circuits 133A, 133B, and a coefficient storage circuit 132. Operation circuit 12K has the same configuration as that of operation circuit 12F according to Embodiment 7, except for I/O transformation circuit 131K. Thus, description of the other configuration of operation circuit 12K will be omitted.

I/O transformation circuit 131K directly receives outputs $f_i$ from multiple operators CLk included in operation circuit 12J, and identifies output $f_i$ for each operator CLk of operation circuit 12K to operate among outputs $f_i$. I/O transformation circuit 131K stores the identified output $f_i$ into storage circuit MIk that is included in input storage circuit 133 and corresponding to operator CLk, in an order in which output $f_i$ is operated. While 2 operation circuits are shown connected together, three or more operation circuits may be connected.

According to Embodiment 10, two or more operation circuits 12F according to Embodiment 7 can be connected together. For example, when two or more operation circuits 12F are connected within an LSI circuit, if I/O transformation circuit 131K is included in the connecting portion connecting operation circuits 12F, the two processes by output transformation circuit 141 and input transformation circuit 131 can be done by one process by I/O transformation circuit 131K. Accordingly, the process can be accelerated although multiple operation circuit are connected together.

Variations of the Embodiments

Figure 24:
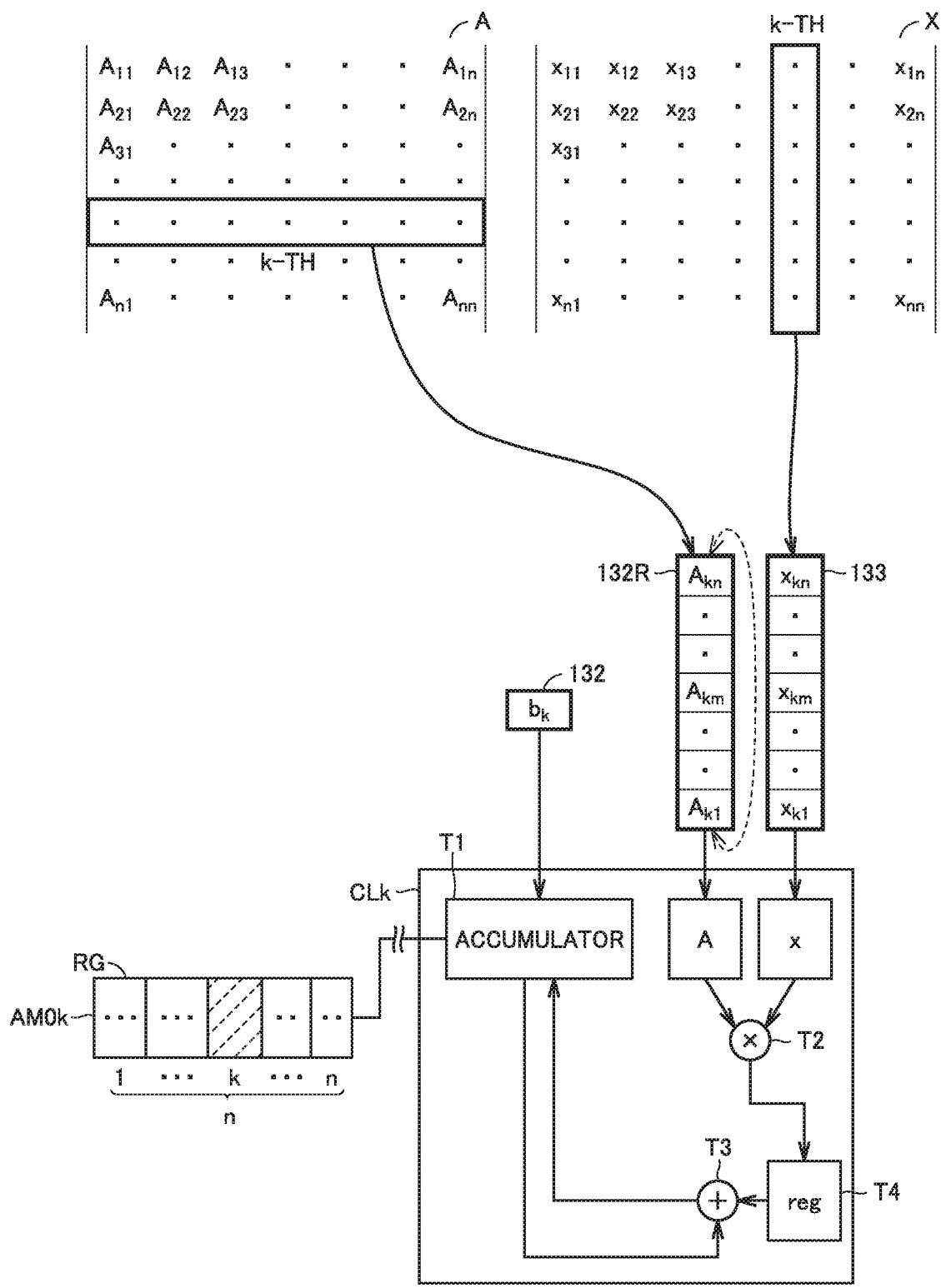
FIG. 24 is a diagram schematically showing one example configuration which allows for execution of an operation in accordance with a "matrix case" of the operation circuit according to respective embodiments of the present invention.

The operation circuit according to respective embodiments may be modified as shown in FIG. 24. FIG. 24 is a diagram schematically showing one example configuration which allows for execution of an operation in accordance with a "matrix case" of the operation circuit according to respective embodiments of the present invention. The operation circuit according to Embodiments 1 to 8 can be configured to be capable of calculating a multiply-and-add operation in accordance with the "matrix case" as shown in FIG. 24. FIG. 24 shows an operator CLk which can execute a multiply-and-add operation for an n×n coefficient matrix A and an n×n matrix X corresponding to input data 100.

Referring to FIG. 24, operator CLk has the same configuration as that shown in FIG. 11, and thus the description thereof will not be repeated. In FIG. 24, operator CLk is connected to a coefficient storage circuit 132R, a coefficient storage circuit 132 which stores elements of a bias vector b, and an input storage circuit 133 which are readable from operator CLk. Input storage circuit 133 has the same configuration as shown in FIG. 11. Coefficient storage circuit 132R includes a ring buffer as indicated by the dashed line.

A result of the multiply-and-add operation by operator CLk is stored into a storage circuit AMOk. Storage circuit AMOk includes n registers RG. Accordingly, storage circuits AMOk (k=1, 2, . . . , n) each includes the same number of registers RG as the number of dimensions (n×n) of the matrix.

While FIG. 24 shows one of multiple operators CLk included in the operator, the other operators CLk has the same configuration. Matrix X is assumed to include n column vectors, and elements of matrix X are input into input storage circuit 133 of FIG. 24 in an order of column priority. For example, elements $x_{k1}$ to $x_{kn}$ at the k-th column of matrix X are stored in input storage circuit 133 of FIG. 24.

Similar to Embodiments 1 to 8, operator CLk repeats one column of multiply-and-add operations for each column of matrix X. Operator CLk performs multiply-and-add operations for the k-th row of coefficient matrix A and each column of matrix X and outputs n values (corresponding to output $f_i$) of the multiply-and-add operations. In these multiply-and-add operations also, non-zero elements $A_{ij}$ are selected from among the elements of the k-th row of coefficient matrix A, and multiply-and-add operations using the selected non-zero elements $A_{ij}$ are performed. For the sake of description, assume that the k-th row of coefficient matrix A does not include zero element $A_{ij}$.

The n values of the multiply-and-add operations output from operator CLk are stored into n registers RG included in storage circuit AMOk. FIG. 24 shows a state in which, for example, operator CLk performs multiply-and-add operations using the k-th column of matrix X and the values of the multiply-and-add operations are stored in the k-th register RG (register RG indicated using hatching) of storage circuit AMOk.

Once operator CLk (k=1, 2, . . . n) finishes multiply-and-add operations, results of the multiply-and-add operations using coefficient matrix A and matrix X are stored in (n×n) registers RG included in storage circuit AMOk (k=1, 2, . . . n) of the output storage circuit.

Here, as background of the embodiments, while operator CLk repeats the multiply-and-add operation, input of coefficient matrix A of operator CLk needs to be initialized after the completion of the multiply-and-add operations for the k-th column of matrix X and before the initiation of multiply-and-add operations for the next column (k+1-th column). For example, coefficient matrix A needs to be initialized so that elements can be read, starting from the beginning of the k-th row of coefficient matrix A. Accordingly, the initiation of multiply-and-add operations for the next column may be delayed for a time period taken for the initialization.

In order to avoid such delay, in FIG. 24, the elements of the k-th row of coefficient matrix A are stored in a ring buffer included in coefficient storage circuit 132R. This allows, once multiply-and-add operations for the k-th column of matrix X are completed, operator CLk of FIG. 24 to start multiply-and-add operations for the next column (k+1-th column) without performing the initialization. Accordingly, multiply-and-add operations in the "matrix case" can be performed at a high speed.

Note that a coefficient storage circuit which includes a ring buffer can also be used for a multiply-and-add operation using coefficient matrix A and an input vector x as described in Embodiments 1 to 8. Accordingly, application of the operation circuit of FIG. 24 to Embodiments 1 to 8 allows for acceleration of multiply-and-add operations in both the a multiply-and-add operation using matrix×vector and a multiply-and-add operation using matrix×matrix in accordance with the "matrix case".

Further Variations of Embodiments

Figure 25:
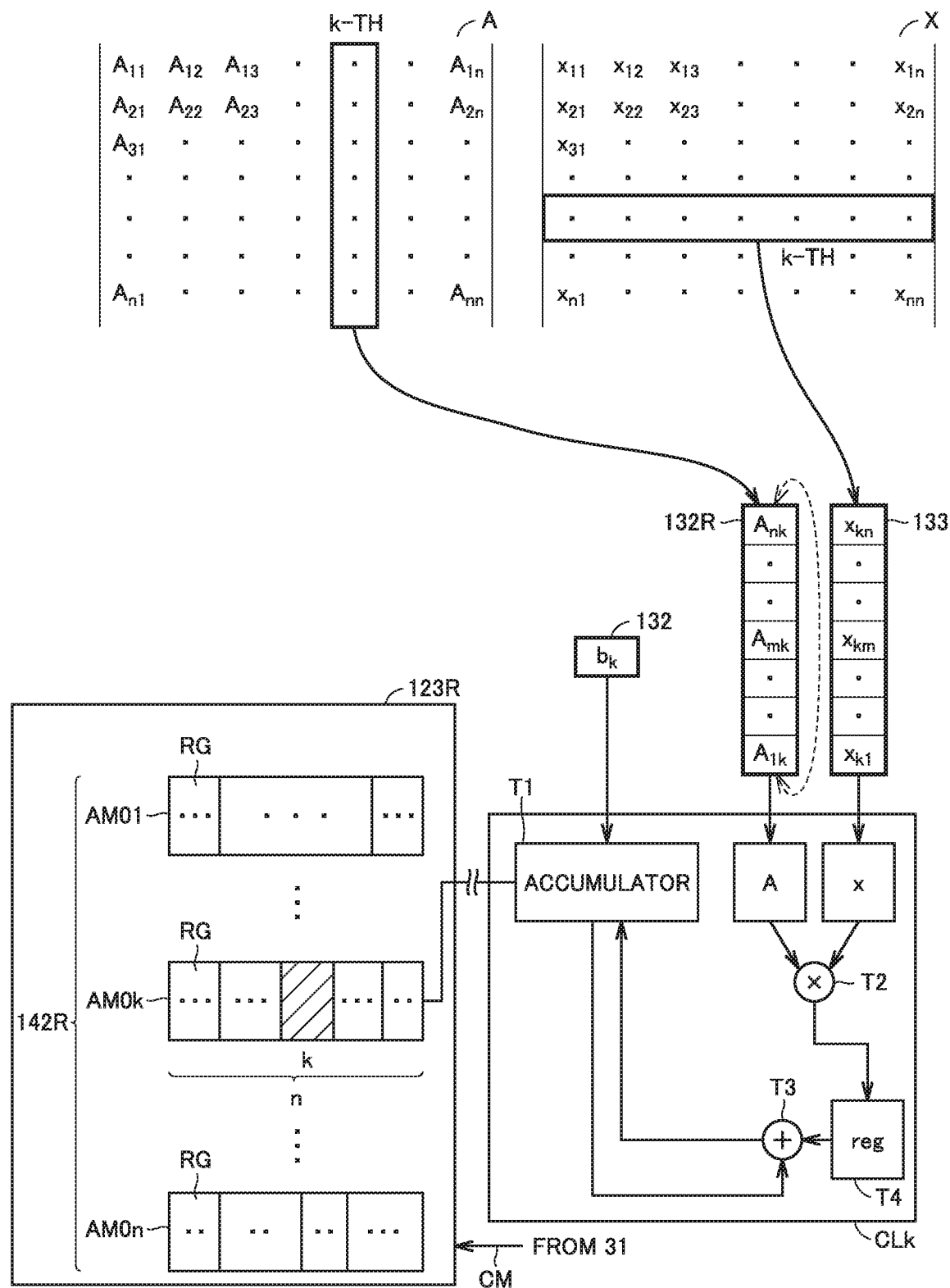
FIG. 25 is a diagram schematically showing another example configuration which allows for execution of an operation in accordance with the "matrix case" of the operation circuit according to respective embodiments of the present invention.

Further variations of the embodiments will be described. The operation circuit according to respective embodiments may be modified as illustrated in FIG. 25. FIG. 25 is a diagram schematically showing another example of the configuration which allows for execution of an operation in accordance with the "matrix case" of the operation circuit according to respective embodiments of the present invention. The operation circuit are shown in FIG. 25 is applicable to the operation circuit according to Embodiments 1 to 8. Similarly to FIG. 24, FIG. 25 also shows an operator CLk which can execute a multiply-and-add operation for an n×n coefficient matrix A and an n×n matrix X.

Operator CLk, coefficient storage circuits 132 and 132R, and input storage circuit 133, and storage circuit AMOk in FIG. 25 have the same configuration as that of those shown in FIG. 24, and thus the description thereof will not be repeated. In FIG. 25, the operation circuit includes an output interface 123R. Output interface 123R includes an output storage circuit 142R which includes n storage circuits AMOk (k=1, 2, . . . , n).

Unlike the case illustrated in FIG. 24, in FIG. 25, elements of matrix X are stored into input storage circuit 133 in an order of row priority, and elements of the k-th column of coefficient matrix A are stored into a coefficient storage circuit 132R. As such, in a multiply-and-add operation using operator CLk of FIG. 25, assume that matrix X is formed of row vectors, and coefficient matrix A is formed of column vectors.

Once the k-th row vector (all the elements $x_{k1}$ to $x_{kn}$ of the row vector) of matrix X is stored in input storage circuit 133, operator CLk of FIG. 25 performs multiply-and-add operations using the stored elements $x_{k1}$ to $x_{kn}$ and elements $A_{k1}$ to $A_{kn}$ in the k-th column of coefficient matrix A. In the multiply-and-add operations, non-zero elements $A_{ij}$ are selected from among elements $A_{k1}$ to $A_{kn}$, and multiply-and-add operations using the selected non-zero elements $A_{ij}$ are performed. For the sake of description, assume that the k-th column of coefficient matrix A does not include zero element $A_{ij}$.

Upon completion of the multiply-and-add operations using coefficient matrix A and matrix X, values as results of the multiply-and-add operations are stored as elements Tij into n×n registers RG included in n storage circuits AMOk of output storage circuit 142R. Accordingly, a matrix T having a (n×n) dimension is stored in output storage circuit 142R.

Processor 31 determines an order in which elements Tij are read from matrix T, and outputs a control command CM to output interface 123R so that elements Tij are read from register RG in accordance with determined the order. For example, assume that the next (another) operation circuit 12 is connected to the output stage of operation circuit 12 which includes operator CLk of FIG. 25. In this case, control command CM includes, as input data to the next operation circuit 12, a designation indicating whether the input data is according to row priority or according to row priority. In accordance with control command CM, output interface 123R reads elements Tij from n×n registers RG. This allows the next operation circuit 12 to receive elements $x_{ij}$ of matrix X of input data in the order of column priority or in the order of row priority.

According to FIG. 25, if operation circuit 12 performs multiply-and-add operations using a matrix and a matrix, and a resultant matrix T is received by the next operation circuit 12 as an input (i.e., matrix X), the next operation circuit 12 is not required to sort elements $x_{ij}$ of matrix X in an order of column priority or an order of row priority to perform multiply-and-add operation processes.

Specifically, typically, if matrix X forwarded to operation circuit 12 via external input device 61 or external storage device 62 is an image or the like, external input device 61 or external storage device 62 outputs elements $x_{ij}$ of matrix X in an order of row priority to operation circuit 12. Accordingly, if elements $x_{ij}$ of matrix T are output to the next operation circuit 12 without being sorted, the next operation circuit 12 needs to sort elements Tij of matrix T in an order of row priority prior to initiating the add operation. In constant, in FIG. 25, output interface 123R reads elements Tij from output storage circuit 142R, in accordance with control command CM.

Specifically, processor 31 sets control command CM, based on, for example, a type of input data (i.e., elements $T_{ij}$ of matrix T) to be subjected to the multiply-and-add operation process. This type can include an image. If the type of input data is image, processor 31 sets to control command CM a "row priority" read command otherwise set a "column priority" read command.

When control command CM indicates a "row priority" read command, output interface 123R reads elements Tij from n×n registers RG in an order of row priority in accordance with the indicates of elements Tij. If control command CM indicates a "column priority" read command, output interface 123R reads elements Tij in an order of column priority in accordance with the indicates of elements Tij. As such, based on a type of input data (whether it is image or not, for example), the next operation circuit 12 can receive an input (i.e., matrix X) in which elements Tij of matrix T are arranged in accordance with one of the column priority and the row priority, thereby obviating the need for rearrangement of element $x_{ij}$ in matrix X. This allows operation circuit 12 to perform the multiply-and-add operation process in an accelerated manner.

The presently disclosed embodiment should be considered in all aspects illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST

12, 12A, 12B, 12C, 12D, 12E, 12F, 12G, 12H, 12I, 12J, 12K operation circuit; 17 port; 61 external input device; 62 external storage device; 63 external output device; x input vector; 111, A coefficient matrix; 121 parallel operation circuit; 124 shared memory; 131, 131A input transformation circuit; 132, 132D coefficient storage circuit; 133 input storage circuit; 133A, 133B duplexed input storage circuit; 133C input notification circuit; 141 output transformation circuit; 142 output storage circuit; 142A, 142B duplexed output storage circuit; 143, 143I output notification circuit; CLk operator; Ck, Cn, MIk, MOk storage circuit.

The invention claimed is:

1. An operation circuit, comprising:
   a parallel operation circuit which includes a plurality of operators; and
   an input interface which includes a plurality of storage circuits, wherein
   the plurality of operators are in one-to-one correspondence with the plurality of storage circuits,
   each of the plurality of operators performs an operation using data stored in a corresponding storage circuit,
   each of the plurality of storage circuits has:
   an input storage circuit that stores input data; and
   a coefficient storage circuit that stores coefficient data,
   the operation circuit generates an input vector by combining rows of the input data,
   the input vector and the coefficient data each have an index designating an operator by which the data is operated among the plurality of operators and designating an order in which the data is operated, and
   the input interface stores the input data and the coefficient data from an external unit, in accordance with the order based on the index of the data, into the input storage circuit and the coefficient storage circuit that are corresponding to an operator among the plurality of operators.

2. The operation circuit according to claim 1, wherein
   the input storage circuit includes duplexed input storage circuits,
   one of the duplexed input storage circuits stores the input data from the external unit, and upon completion of storing of the input data, the input data is readable from the one of the duplexed input storage circuits by a corresponding operator, and
   input data is read from the other one of the duplexed input storage circuits by the corresponding operator, and upon completion of reading of the input data, the other one of the duplexed input storage circuits stores the input data from the external unit.

3. The operation circuit according to claim 1, wherein
   each of the plurality of operators is configured to multiply a coefficient matrix by the input vector from a right side of the coefficient matrix and outputs results of operation to an output vector, the coefficient matrix including a non-zero element and a zero-element; and
   the input data includes elements of the input vector; and
   the coefficient data includes elements of the coefficient,
   each of the plurality of operators is further configured to sequentially multiply the elements of the input vector by a corresponding one of the elements of the coefficient matrix, and adds a result of multiplication to an element of the output vector.

4. The operation circuit according to claim 3, wherein
   the parallel operation circuit further multiplies the coefficient matrix by an input matrix from a right side of the coefficient matrix, and outputs results of operation to an output matrix,
   the input vector includes a row or column vector included in the input matrix, and a row or column vector included in the output matrix includes the output vector corresponding to each of the plurality of operators.

5. The operation circuit according to claim 4, further comprising
an output interface which includes a plurality of output storage circuits that store the output matrix, wherein
the plurality of output storage circuits are in one-to-one correspondence with the plurality of operators,
each of the plurality of output storage circuits stores the output vector from a corresponding operator, and
the output interface reads elements of the output matrix from the plurality of output storage circuits by column priority or row priority based on the index.

6. The operation circuit according to claim 5, wherein
the output interface reads the elements of the output matrix from the plurality of output storage circuits by the column priority or the row priority in accordance with a control command.

7. The operation circuit according to claim 6, wherein
when the output matrix is output to another operation circuit as the input matrix, the control command includes a read command in accordance with column priority or row priority, based on a data type represented by the elements of the output matrix.

8. The operation circuit according to claim 7, wherein the data type includes image.

9. The operation circuit according to claim 3, wherein
the coefficient storage circuit includes a ring buffer,
the coefficient storage circuit stores elements of a row or column vector included in the coefficient matrix.

10. The operation circuit according to claim 9, wherein
the index of the element further designates an operator by which the element is operated, and
the input interface writes the elements of the row or column vector included in the coefficient matrix from the external unit into the ring buffer of the coefficient storage circuit corresponding to the designated operator among the plurality of operators, in the order based on the index of each element.

11. The operation circuit according to claim 3, wherein
the external unit includes another operation circuit, and
the input vector includes a vector output from each operator included in the other operation circuit.

12. The operation circuit according to claim 3, wherein
the operation circuit performs operations in a convolution layer in a convolutional neural network,
the input vector is a column obtained by deploying a feature map which is an input to the convolution layer, and
the coefficient matrix corresponds to a kernel used in the convolution layer.

13. The operation circuit according to claim 5, wherein
the output interface further includes an output circuit and a plurality of ports that output the output vector from each of the plurality of operators to the external unit, wherein
the plurality of output storage circuits are in one-to-one correspondence with the plurality of ports, and
upon receipt of an element of the output vector from each of the plurality of operators, the output circuit is configured to select an output storage circuit from among the plurality of output storage circuits, based on predetermined reference information and the index of the element, and store the element into the selected output storage circuit.

14. The operation circuit according to claim 13, wherein
the output circuit is further configured to store the element of the output vector into the selected output storage circuit, based on the predetermined reference information and the index of the element of the output vector.

15. The operation circuit according to claim 13, wherein
when a predetermined number of elements are stored into the plurality of output storage circuits, the output circuit outputs stored elements in the plurality of output storage circuits via the plurality of ports.

16. The operation circuit according to claim 15, wherein
when the predetermined number of elements are stored into the plurality of output storage circuits, the output circuit outputs to the external unit a notification indicating that the output circuit is to output the stored elements via the plurality of ports.

17. The operation circuit according to claim 13, wherein
each of the plurality of output storage circuits includes duplexed output storage circuits,
one of the duplexed output storage circuits stores the elements of the output vector from the operator, and upon completion of storing of the elements, the elements are read from the one of the duplexed output storage circuits via a corresponding one of the plurality of ports, and
the elements are read from the other one of the duplexed output storage circuits via a corresponding one of the plurality of ports, and upon completion of reading of the elements, the elements of the output vector from the operator are stored into the other one of the duplexed output storage circuits.

18. The operation circuit according to claim 1, further comprising
a shared memory that stores a result of operation by one operator among the plurality of operators, and is readable by other operators.

19. An operation circuit, comprising:
a parallel operation circuit which includes a plurality of operators; and
an input interface which includes a plurality of storage circuits, wherein
the plurality of operators are in one-to-one correspondence with the plurality of storage circuits;
each of the plurality of operators performs an operation using coefficient data and input data,
each of the plurality of storage circuits has a coefficient storage circuit that stores the coefficient data,
the input interface further includes an input circuit that stores the coefficient data from an external unit into the plurality of storage circuits corresponding to the plurality of operators,
the operation circuit generates an input vector by combining rows of the input data,
the input vector and the coefficient data each have an index identifying an operator by which the input data is operated, among the plurality of operators, and an order in which the input data is operated,
the input circuit stores the coefficient data from the external unit into the coefficient storage circuit corresponding to an operator among the plurality of operators, in accordance with the order based on the index of the input vector, and
upon receipt of the input vector from the external unit, the input interface outputs the input data to an operator indicated by the index of the input vector.

20. A method of operation using a parallel operation circuit including a plurality of operators, the parallel operation circuit including storage circuits which are in one-to-one correspondence with and readable from the plurality of operators, the method, comprising:

receiving, from a unit, coefficient data and an input vector generated by combining rows of the input data, the coefficient data and the input vector each including an index designating an operator by which the input data is operated among the plurality of operators and designating an order in which the input data is operated;

upon receipt of the coefficient data or the input data, identifying an operator among the plurality of operators based on the index of the coefficient data or the input data; and storing the coefficient data or the input data into a storage circuit corresponding to the identified operator among the storage circuits, in accordance with the order based on the index of the coefficient data or the input vector.

21. A method of operation using a parallel operation circuit which includes a plurality of operators, the parallel operation circuit including storage circuits which are in one-to-one correspondence with and readable from the plurality of operators, each of the storage circuits including a circuit that stores coefficient data for operation, the method, comprising:

receiving, from a unit, an input vector generated by combining rows of input data for operation, the input vector and the coefficient data each having an index designating an operator by which the data is operated among the plurality of operators and designating an order in which the data is operated, each of the storage circuits configured to store the coefficient data in accordance with the order based on the index of the coefficient data;

upon receipt of the input vector, identifying an operator among the plurality of operators based on the index of the input vector; and outputting the input data to the identified operator, in accordance with the order based on the index of the input vector.

* * * * *